US008374644B2

(12) United States Patent
Nagasawa et al.

(10) Patent No.: US 8,374,644 B2
(45) Date of Patent: Feb. 12, 2013

(54) METHOD AND APPARATUS FOR ESTABLISHING A CALL CONNECTION BASED ON A COMMUNICATION SYSTEM CONDITION DESIRED BY A CALLING PARTY

(75) Inventors: Chizuko Nagasawa, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 201 days.

(21) Appl. No.: 12/672,470

(22) PCT Filed: Aug. 5, 2008

(86) PCT No.: PCT/JP2008/064040
§ 371 (c)(1),
(2), (4) Date: May 19, 2010

(87) PCT Pub. No.: WO2009/020120
PCT Pub. Date: Feb. 12, 2009

(65) Prior Publication Data
US 2011/0195693 A1  Aug. 11, 2011

(30) Foreign Application Priority Data
Aug. 6, 2007  (JP) .................. 2007-204655

(51) Int. Cl.
*H04W 4/00* (2009.01)
*H04W 72/00* (2009.01)
*H04M 1/00* (2006.01)
(52) U.S. Cl. ................ 455/552.1; 455/422.1; 455/452.2
(58) Field of Classification Search .... 455/412.1–412.2, 455/415–420, 422.1, 423–425, 432.1–432.3, 455/434, 466, 550.1, 552.1, 556.2, 70, 266, 455/403, 435.2–435.3, 452.2, 517, 524–525, 455/553.1, 554.1–554.2, 560–561; 709/226–228; 370/328, 338, 395.2–395.21, 395.3, 395.4, 370/395.5, 395.52, 468
See application file for complete search history.

(56) References Cited

U.S. PATENT DOCUMENTS
6,591,103 B1 * 7/2003 Dunn et al. ............ 455/436
2003/0227939 A1 * 12/2003 Yukie et al. ............ 370/465
(Continued)

FOREIGN PATENT DOCUMENTS
JP  9-46432       2/1997
JP  2002-152830   5/2002
(Continued)

OTHER PUBLICATIONS
Supplementary European Search Report for European Patent Application No. 08827116, mailed Dec. 7, 2011, 5 pages.
(Continued)

Primary Examiner — Meless Zewdu
(74) Attorney, Agent, or Firm — Duane Morris LLP

(57) ABSTRACT

An origination terminal in accordance with the present invention is provided with a control unit for controlling, when receiving information indicating that a destination terminal uses a network different from a network desired by an originator, so as to transmit a call enable notification request requesting the destination terminal, when the destination terminal can connect to the network desired by the originator, to transmit a call enable notification notifying the originator accordingly. The destination terminal in accordance with the present invention is provided with a control unit for controlling, when receiving the call enable notification request from the origination terminal, so as to transmit the call enable notification when the destination terminal can connect to the network desired by the originator.

7 Claims, 25 Drawing Sheets

U.S. PATENT DOCUMENTS

| | | | |
|---|---|---|---|
| 2005/0063360 A1* | 3/2005 | Lowmaster | 370/352 |
| 2006/0205400 A1* | 9/2006 | Kiyomoto | 455/425 |
| 2006/0227949 A1* | 10/2006 | Shaffer et al. | 379/142.14 |
| 2007/0202895 A1* | 8/2007 | Benco et al. | 455/466 |
| 2007/0237319 A1* | 10/2007 | Brown et al. | 379/142.05 |

FOREIGN PATENT DOCUMENTS

| | | |
|---|---|---|
| JP | 2003-339083 | 11/2003 |
| JP | 2005-223635 | 8/2005 |
| WO | WO-2004/095818 | 11/2004 |
| WO | WO-2007/043201 | 4/2007 |

OTHER PUBLICATIONS

International Search Report for PCT/JP2008/064040, mailed on Nov. 18, 2008, 2 pages.

Rosenberg et al., SIP: Session Initiation Protocol, RFC 3261, Jun. 2002, retrieved from http://www.ietf.org/rfc/rfc3261.txt.

Office Action from Korean Patent Application No. 10-2010-7002650, mailed on Apr. 28, 2011.

First Office Action (with translation) for CN 200880102099.9, issued Apr. 6, 2012, 6 pages.

\* cited by examiner

FIG. 6

| NUMBER | ADDRESS | REGISTERED NETWORK |
|---|---|---|
| 9500 | 111, 111, 111, 111 | IEEE806.16e |
| 8000 | 123, 123, 123, 123 | EVDO |
| 7000 | 222, 222, 222, 222 | WLAN |
| ⋮ | ⋮ | ⋮ |

FIG. 7

```
Contact-Type:application/IP-TV-info+xml        <--NAME OF APPLICATION TO BE USED b=" AS:500"                                    <--BANDWIDTH REQUIRED FOR APPLICATION Media-Name:IEEE802.16e
Media-Name:EV-DO                               <--NETWORK TO WHICH TERMINAL OF CALLING SIDE CAN CONNECT
Required:Media-Name;IEEE802.16e;EV-DO;CDMA-1X;WLAN Media-Pref:IEEE802.16e                         <--WIRELESS NETWORK DESIRED BY CALLING SIDE
Required:Media-Pref;IEEE802.16e;EV-DO;CDMA-1X;WLAN Com-Media-Sel-Pref:bandwidth                   <--EXTENDED FUNCTION OF DESIRED CONDITION ON SELECTION OF WIRELESS NETWORK AT CALLED SIDE
Required:Com-Media-Sel-Pref;bandwidth;billing  <--NOTIFY EXTENSION HEADER AND OPTION TAG
```

| ORIGINATION NUMBER | DESTINATION NUMBER | WIRELESS NETWORK DESIRED BY ORIGINATOR |
|---|---|---|
| 9500 | 9800 | IEEE802.16e |
| 8000 | 8100 | EVDO |
| 7000 | 7200 | WLAN |
| ⋮ | ⋮ | ⋮ |

CONTENTS OF NOTIFICATION REQUEST 1/2

ADDRESSED TO: TARO YAMADA (9000)

APPLICATION TO USE: VIDEOPHONE

DESIRED NETWORK: IEEE802.16e

OK   CANCEL (b)

CONTENTS OF NOTIFICATION REQUEST 2/2

VALID DURATION:
- ○ 1h
- ○ 12h
- ◎ 24h
- ○ [    ] h

MESSAGE:
- ○ NOT IMPORTANT
- ◎ WISH TO CALL WITH HIGH-QUALITY VIDEOPHONE
- ○ [    ]

RETURN   OK   CANCEL

FIG. 16

```
MESSAGE sip:9000@sipserver.jp SIP/2.0
Via: SIP/2.0/UDP 172.17.1.50:5060;branch=z9hG4bK3495ebdc
Max-Forwards: 70
From: 9500@sipserver.jp;tag=1448274908
Call-ID:slaiji19083-ejlaiorfasjssdfowe789sdf0qs98dsdf09sdffs8909000
Cseq:1 MESSAGE
Allow: INVITE, ACK, CANCEL, BYE, OPTIONS, REGISTER, MESSAGE, SUBSCRIBER, NOTIFY
Content-Type: text/plain
Content-Length:

Message-Type: report-request
Send-Time: 2007/01/01 01:20:25
Request-ID: 12345
Caller-NW: IEEE802.16e
Receiver-NW: IEEE802.16e
Valid Duration: 24h
Application: video-phone
Bandwidth: 5000000bps
Message :" WISH TO CALL WITH HIGH-QUALITY VIDEOPHONE"
```

AUTOMATIC RESPONSE SETTING FOR
CONNECTION NOTIFICATION (SILENT MODE)

| MODE | GRANT/REJECTION |
|---|---|
| NORMAL MODE | EACH NOTIFICATION PARTY |
| SILENT MODE | REJECT ALL |

( REJECT ALL ) ( EACH NOTIFICATION PARTY ) ( GRANT ALL )

(b)

AUTOMATIC RESPONSE SETTING FOR
CONNECTION NOTIFICATION
(EACH NOTIFICATION PARTY)

SET RESPONSE FOR EACH
NOTIFICATION PARTY

| NOTIFICATION PARTY | GRANT/REJECT |
|---|---|
| TARO YAMADA | × |
| JIRO YAMADA | × |
| HANAKO YAMADA | ○ |

( ○ (GRANT) ) ( × (REJECT) )

FIG. 20

| NOTIFICATION REQUEST ID | REQUEST TRANSMISSION TIME | VALID DURATION | DESTINATION | NETWORK DESIRED BY ORIGINATOR | NETWORK DESIRED BY DESTINATION | DESIRED APPLICATION | REQUIRED BANDWIDTH | MESSAGE |
|---|---|---|---|---|---|---|---|---|
| 12345 | 2007/07/01 01:26:25 | 24h | 900A@sipserver.jp | IEEE802.16e | IEEE802.16e | VIDEO PHONE | 50kbps | WISH TO CALL WITH HIGH-QUALITY VIDEOPHONE |
| 67890 | 2007/12/30 11:45:32 | 96h | 800D@sipserver.jp | IEEE802.16e | IEEE802.16e | VIDEO PHONE | 50kbps | WISH TO CALL WITH HIGH-QUALITY VIDEOPHONE |
| ... | ... | ... | ... | ... | ... | ... | ... | ... |

FIG. 21

| REQUEST TRANSMISSION TIME | VALID DURATION | REQUEST RESPONSE TIME | ORIGINATOR | NOTIFICATION REQUEST ID | NETWORK DESIRED BY ORIGINATOR | NETWORK DESIRED BY DESTINATION | DESIRED APPLICATION | REQUIRED BANDWIDTH | MESSAGE |
|---|---|---|---|---|---|---|---|---|---|
| 2007/01/31 01:26:25 | 24h | 2007/01/31 01:50:21 | 19503a@sipserver.jp | 12345 | IEEE802.16e | IEEE802.16e | VIDEOPHONE | 5Mbps | WISH TO CALL WITH HIGH-QUALITY VIDEOPHONE |

FIG. 24

| DESTINATION | DATE AND TIME | NETWORK | STATE |
|---|---|---|---|
| 9000 | 2006/10/21 22:05 | IEEE 802.16e | ×→○ |
| 9000 | 2006/10/21 22:10 | IEEE 802.16e | ○ |
| 9000 | 2006/10/21 22:15 | IEEE 802.16e | ○ |
| 9000 | 2006/10/21 22:20 | IEEE 802.16e | ○ |
| 9000 | 2006/10/21 22:40 | IEEE 802.16e | ○ |
| 9000 | 2006/10/23 21:32 | IEEE 802.16e | ○ |
| 9000 | 2006/11/1 13:30 | EVDO | ○ |
| ⋮ | ⋮ | ⋮ | ⋮ |

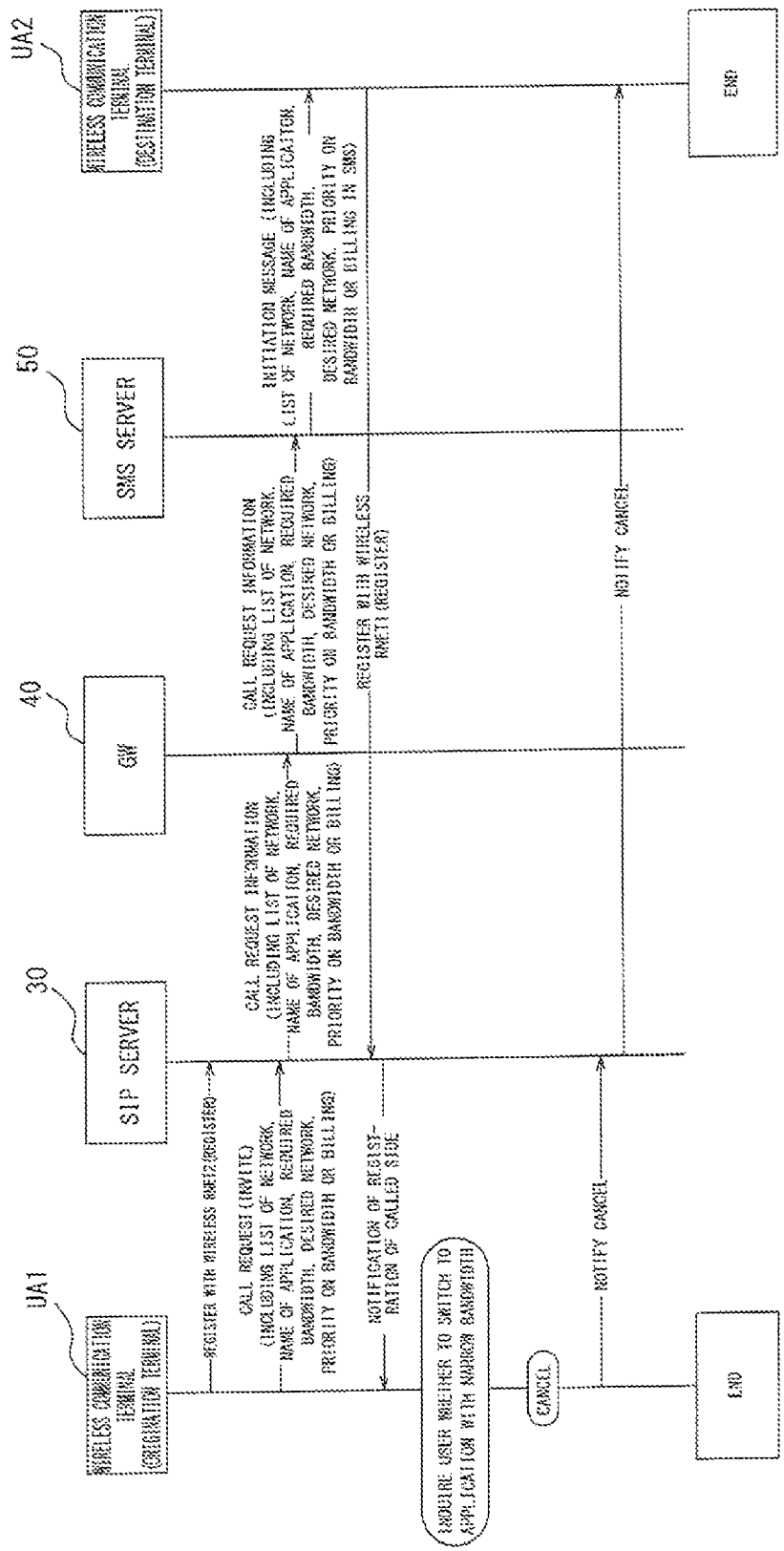

METHOD AND APPARATUS FOR ESTABLISHING A CALL CONNECTION BASED ON A COMMUNICATION SYSTEM CONDITION DESIRED BY A CALLING PARTY

CROSS REFERENCE TO RELATED APPLICATIONS

This application is a U.S. National Phase of International Application No. PCT/JP2008/064040 (filed on Aug. 5, 2008), which claims priority to and the benefit of Japanese Patent Application No. 2007-204655 (filed on Aug. 6, 2007), the entire contents of which are incorporated herein by reference.

TECHNICAL FIELD

The present invention relates to a communication apparatus, a wireless communication apparatus and a communication control method.

BACKGROUND ART

SIP (Session Initiation Protocol) is a standard defined as one of call control protocols achieving call control such as a connection request with a real-time application of an internet phone based on VoIP (Voice over Internet Protocol). (For example, see Non-Patent Document 1.)

SIP was used originally for VoIP communication between computers such as personal computers and servers connected via a wired network on the internet. In recent years, however, an SIP server of wireless carriers (operators) supporting SIP and a wireless communication terminal (apparatus) have been developed, as digitalization of and adoption of IP technology to wireless communication equipment has progressed. Moreover, recent development of wireless communication technology enables a single wireless communication terminal to be provided with a plurality of wireless communication devices connectable to different wireless communication systems (wireless communication networks). Typical applications are PDA, PC and a cellular phone provided with a first wireless communication device connectable to a cellular phone network and a second wireless communication device connectable to a station of a wireless LAN such as WiFi and WiMAX, or MAN (Metropolitan Area Network).
Non-Patent Document 1: the website at http://www.ietf.org/rfc/rfc3261.txt (a document of RFC defining SIP)

SUMMARY OF INVENTION

Technical Problem

The SIP technology, however, was originally intended for use in a wired communication network, not in a wireless communication network in which a bandwidth and the communication quality change constantly. In addition, the SIP technology was not intended for use in the wireless communication apparatus connectable to a plurality of wireless communication networks. Accordingly, the SIP technology in the wired communication network on the internet has been developed, while the SIP technology on the premise of communication environments across a plurality of different kinds of wireless networks has been underdeveloped.

FIG. 25 shows a configuration diagram of a wireless communication network of the conventional art. As shown in the figure, serving as servers or gateways are a DNS server 10, an SIP server 20, an SIP server 30, a gateway (GW) 40, an SMS server 50, an SIP server (or GW) 60, and an SIP server (or GW) 70. Wireless communication terminals UA1 and UA2 and a communication terminal (softphone) UA3 serve as communication terminals of a calling side and a called side and a softphone, respectively. These terminals are connected to the servers via the internet NET1, an operator packet network NET2, an operator circuit switching network NET3 and operator wireless communication packet networks RNET1, RNET2.

For example, in the configuration of the wireless communication network as shown in the figure, when the wireless communication terminal UA2 is called (instructed to connect to the packet network and to register) by an SMS (Short Message Service) message from the SMS server 50 of the circuit switching network corresponding to the operator wireless communication packet network RNET1 in response to an SIP connection request (calling: Invite) by the wireless communication terminal UA1, the wireless communication terminal UA2 performs a registration operation (Register) of SIP (Session Initiation Protocol) to the SIP server 30 via the packet switching network (in this case, RNET1) of the wireless communication network corresponding to the circuit switching network (that is, provided by the same carrier) which is called, and establishes a call by performing SIP procedure thereafter. This method is on the premise of the wireless communication terminal which can use only a single operator wireless communication packet network and a circuit switching network corresponding thereto. When the wireless communication terminal UA2, on the other hand, has a function to connect to two operator wireless communication packet networks RNET1 and RNET2 and thus has two options, as shown in FIG. 26, SIP of the conventional art (that is, the wireless communication terminal UA2 having SIP) performs SIP registration via the network (the operator wireless communication packet network RNET1, in this example) corresponding to a path through which a message including a connection request (instruction to connect to the packet network and to register) has passed, as described above, and establishes a session with a caller/calling side (Calling Party) by use of the path of the packet network. In such a method for establishing the session, a bandwidth corresponding to an application which a user at the calling side (Calling Party) desires to use or a wish or a preference of the user at the calling side with regard to billing and the likes is not always reflected. That is, the preference of the user (Calling Party) who sent the connection request is not considered at all.

Even if the calling side informs the called side of the preference (condition) it desires when calling with a call establishment message (INVITE) of SIP, the called side may select a wireless communication system as much corresponding to the condition of the calling side as possible, however, the calling side cannot know the wireless communication system selected by the called side until initiation of the session. In other words, it is only after establishment of the session that a terminal of the calling side can know which wireless communication network a terminal of the called side can connect to (how much bandwidth the called side can use) or which wireless communication system is actually selected by the called side. It is thus not possible before establishment of the session for the calling side to know whether the terminal of the called side satisfies the preference informed by the calling side or to what degree the called side satisfies the preference if satisfying the preference. For example, when the terminal of the called side can connect only to a wireless communication network with a bandwidth not satisfying the required bandwidth, the terminal of the calling side cannot start the communication with the optimum bandwidth and the optimum wireless communication network in consideration of a current wireless communication condition of the terminal at the called side.

For example, when the calling side is connectable to WiMAX (broadband) and EVDO (narrowband) while the called side is connectable to EVDO (narrowband), and the calling side selects broadband WiMAX by prioritizing the bandwidth over billing and makes a call, the called side can connect only to EVDO regardless of the notified condition prioritizing the bandwidth. In such a case, therefore, regardless of the use of broadband WiMAX by the calling side, the narrowband EVDO selected by the called side causes a bottleneck, leading to waste of the bandwidth of WiMAX occupied and consumed by the calling side, because only the bandwidth as much as that of EVDO can be used in the session. It is thus an inefficient usage of bandwidth and waste of power. The wireless communication apparatus, in particular, is often carried constantly changing its wireless communication condition. For connection between the wireless communication apparatuses in such a radio propagation environment constantly changing, a need exists for a development of technology that provides the wireless communication connection efficient for both the called side and the calling side by selecting optimum wireless communication systems according to the wireless communication conditions of both sides. There has thus been a problem that the wireless communication terminal of the caller/calling side (Calling Party) cannot efficiently use a plurality of connectable wireless communication systems (paths, networks and communication devices).

FIG. 26 shows that information on names of available networks, name of the network desired, name of application desired, and required bandwidth is exchanged between the communication terminal of the calling side and the communication terminal of the called side before start of communication between the terminals. However, in a case where the called side cannot use the network or the application desired by the calling side, a previous call is cancelled. Accordingly, when the call is canceled for the reason that the network or the application desired by the calling side cannot be used, it is not possible for the calling side to know when to call next so as to communicate by use of the network and the application it desires.

It is an object of the present invention to provide a technique (apparatus and method) enabling a user to know when to call so as to connect to a called side on a desired network in a case where the user cancels a call for the reason that a wireless communication apparatus of the called side having a plurality of wireless communication systems (device/path, network, bandwidth and the likes) as options cannot use the network desired by the calling side. According to the present invention, the user of the calling side receives a notification from the wireless communication apparatus of the called side when the wireless communication apparatus of the called side can use the network desired by the calling side.

Solution to Problem

In order to achieve the above object, a communication apparatus in accordance with the present invention includes: a transmission unit for transmitting a call request including information on a condition of a wireless communication system of a called side desired by a calling side by use of a predetermined communication system; and a control unit for controlling, when receiving information indicating that the called side uses a wireless communication system not satisfying the condition of the wireless communication system of the called side desired by the calling side in response to the call request transmitted by the transmission unit, so as to transmit a call enable notification request requesting the called side, when the called side can connect to a wireless communication system satisfying the condition of the wireless communication system of the called side desired by the calling side, to transmit a call enable notification notifying the calling side accordingly.

In order to achieve the above object, a wireless communication apparatus capable of using a plurality of different wireless communication systems in accordance with the present invention includes: a message reception unit for receiving, with regard to a call request to be transmitted from a calling side later, an initiation message including a communication condition desired by the calling side and a request requesting use of at least one of the plurality of different wireless communication systems in order to receive the call request; a response unit for responding to the initiation message received so as to receive the call request by use of a predetermined wireless communication system among the plurality of wireless communication systems; and a control unit for controlling, in a case of receiving a call enable notification request, which is a message requesting the called side, when the called side can connect to a wireless communication system satisfying a condition of a wireless communication system of the called side desired by the calling side, to notify the calling side accordingly, in response to a response by the response unit, so as to transmit a call enable notification, which is a message notifying that the called side can connect to a wireless communication system satisfying the condition by use of the wireless communication system when it is connectable to the wireless communication system.

The wireless communication apparatus in accordance with one embodiment of the present invention further includes a request reception unit for receiving the call enable notification request, a determination unit for determining whether to grant the call enable notification request received, and a cancellation unit for cancelling use of the predetermined wireless communication system used by the response unit when determining to grant the call enable notification request received.

The wireless communication apparatus in accordance with another embodiment of the present invention is characterized in that the determination unit, by comparing the call enable notification request received to a condition of a mode which has been set in advance, determines whether to grant the call enable notification request received based on the mode.

The wireless communication apparatus in accordance with still another embodiment of the present invention is characterized in that the determination unit, by comparing the call enable notification request received to a condition of a notification party which has been set in advance, determines whether to grant the call enable notification request received based on the notification party.

In order to achieve the above object, a communication control method in accordance with the present invention includes: a transmission step for transmitting a call request including information on a condition of a wireless communication system of a called side desired by a calling side by use of a predetermined communication system; and a control step for controlling, when receiving information indicating that the called side uses a wireless communication system not satisfying the condition of the wireless communication system of the called side desired by the calling side in response to the call request transmitted at the transmission step, so as to transmit a call enable notification request requesting the called side, when the called side can connect to a wireless communication system satisfying the condition of the wireless communication system of the called side desired by the calling side, to transmit a call enable notification notifying the calling side accordingly.

In order to achieve the above object, a communication control method capable of using a plurality of different wireless communication systems in accordance with one embodiment of the present invention includes: a message reception step for receiving, with regard to a call request to be transmitted from a calling side later, an initiation message including a communication condition desired by the calling side and a request requesting use of at least one of the plurality of different wireless communication systems in order to receive a call request; a response step for responding to the initiation message received so as to receive the call request by use of a predetermined wireless communication system among the plurality of wireless communication systems; and a control step for controlling, in a case of receiving a call enable notification request, which is a message requesting the called side, when the called side can connect to a wireless communication system satisfying a condition of a wireless communication system of the called side desired by the calling side, to notify the calling side accordingly, in response to a response of the response step, so as to transmit a call enable notification, which is a message notifying that the called side can connect to a wireless communication system satisfying the condition by use of the wireless communication system when it is connectable to the wireless communication system.

Advantageous Effects on Invention

According to the present invention, it is possible for a user of a calling side to know when to call so as to connect to a called side on a desired network, since, in a case where the user of the calling side cancels a call for the reason that a wireless communication apparatus of the called side capable of using a plurality of wireless communication systems cannot use the network desired by the calling side, a communication apparatus of the calling side receives a notification, when the wireless communication apparatus of the called side can use the network desired by the calling side, notifying accordingly.

BRIEF DESCRIPTION OF DRAWINGS

FIG. 6 is a table exemplifying a register memory table used for the call control by the SIP server, in the communication control method in accordance with the first embodiment;

FIG. 7 is a diagram exemplifying a call request (INVITE) transmitted by the wireless communication terminal, in the communication control method in accordance with the first embodiment;

FIG. 15($a$) and FIG. 15($b$) are diagrams exemplifying the user selection screens displayed on the wireless communication terminal of the calling side, in the communication control method in accordance with the first embodiment;

FIG. 16 is a diagram exemplifying the call enable notification request transmitted by the wireless communication terminal of the calling side, in the communication control method in accordance with the first embodiment;

FIG. 19($a$) and FIG. 19($b$) are diagrams exemplifying the user selection screens displayed on the wireless communication terminal of the called side, in the communication control method in accordance with the first embodiment;

FIG. 20 is a diagram exemplifying a transmission information history of the call enable notification request stored in the wireless communication terminal of the calling side, in the communication control method in accordance with the first embodiment;

FIG. 21 is a diagram exemplifying a reception information history of the call enable notification request stored in the wireless communication terminal of the called side, in the communication control method in accordance with the first embodiment;

FIG. 24 is a diagram exemplifying a record of connection states of the wireless communication terminal of the called side used for creating the graph in FIG. 23;

FIG. 26 is a sequence diagram showing the communication control until communication is started between the wireless communication terminal of the calling side and the wireless communication terminal of the called side on the wireless communication network of the conventional art.

DESCRIPTION OF EMBODIMENTS

Figure 1:
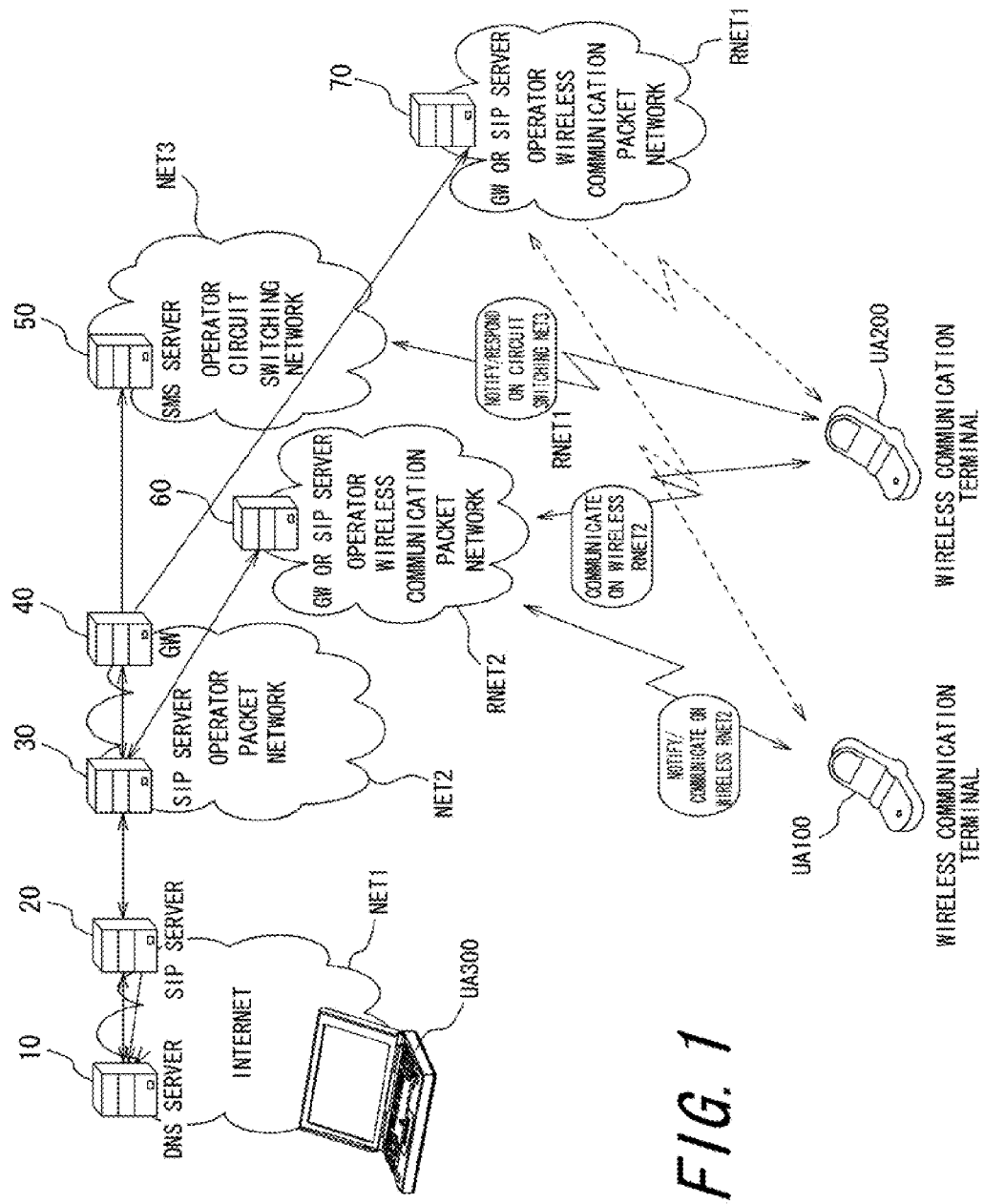
FIG. 1 is a diagram illustrating a communication system of a wireless communication network adopting a communication control method in accordance with a first embodiment of the present invention.

Before detailed descriptions of a principle and a configuration of the present invention, a typical sequence of the present invention will be briefly described. Although the present invention is intended for a variety of types of communication apparatuses and wireless communication apparatuses, and communication control methods therefor, exemplified herebelow is a case where a calling side uses a communication apparatus (communication terminal) including a wireless communication apparatus and a called side uses a wireless communication terminal, which is a typical wireless communication apparatus.

(1) When a communication terminal (apparatus) having a plurality of communication network systems (devices) calls with a real-time application to a wireless communication terminal (apparatus) having a plurality of wireless communication network systems (devices), the communication terminal of the calling side notifies the wireless communication terminal of the called side of a name of a communication network (including a name of a wireless communication network) which the calling side can connect to and a bandwidth required for the real-time application. In consideration of a wireless communication network to which the wireless communication terminal of the called side can connect, the communication network (including the wireless communication network) to which the calling side can connect and the bandwidth required for the application, the wireless communication terminal of the called side selects a wireless communication network and notifies the communication terminal of the calling side of the selected wireless communication network of the called side and a name of the wireless communication network to which the called side can connect, as a response to the calling side. Then, based on information notified from the called side, the communication network to which the calling side can connect and the bandwidth required for the application, the communication terminal of the calling side selects a communication network to connect to and performs necessary SIP procedures on the communication networks (including the wireless communication network) selected by the calling side and the called side, so as to reach a communication state.

(2) Between the communication terminal of the calling side and the communication terminal of the called side, notification of the name of the communication network to which the calling side can connect and the bandwidth required for the real-time application desired by the calling side and notification of the network selected are performed via an SIP server. In addition, after selecting the network to use, the wireless communication terminal of the called side connects to the network selected and registers to the SIP server. The SIP server notifies the communication terminal of the calling side of a name of the network registered.

(3) Being notified of the communication network to which the communication terminal of the calling side can connect and the required bandwidth at the (1), the wireless communication terminal of the called side, if there are a plurality of communication networks satisfying the condition of the bandwidth at calling and called sides, selects a communication network which charges a user at the lowest billing rate.

(4) At the above (2), the communication terminal of the calling side transmits a notification of a name of a network which the calling side desires the called side to connect to, along with the name of the communication network to which the calling side can connect and the required bandwidth for the desired real-time application.

(5) When receiving the notification from the communication terminal of the calling side at the above (4), the SIP server, if the wireless communication terminal of the called side has already connected to the same network as the desired network notified by the calling side and registered therewith, performs necessary SIP procedures without transmitting the notification to the wireless communication terminal of the called side, and reaches the communication state.

(6) When receiving the notification from the communication terminal of the calling side at the above (4), the SIP server stores a combination of the name of the desired network notified, the communication terminal of the calling side and the wireless communication terminal of the called side. When the wireless communication terminal of the called side connects and registers, the SIP server, if the wireless communication terminal of the called side connects to the desired network notified by the communication terminal of the calling side and registered therewith, performs necessary SIP procedures, and reaches the communication state.

(7) In a case where the bandwidth of the selected wireless communication network of the called side at the above (1) does not fulfill the required bandwidth desired by the calling side, the SIP server notifies the communication terminal of the calling side accordingly and the communication terminal of the calling side inquires a user to select either switching to another application which requires (needs) a narrow bandwidth or cancellation of the call to the wireless communication terminal of the called side. When cancellation is selected, the communication terminal of the calling side notifies the wireless communication terminal of the called side of the cancellation and ends communication. When switching to another application is selected, the communication terminal of the calling side switches to a communication network corresponding to the wireless communication network of the wireless communication terminal of the called side, switches to an application usable in the bandwidths of the communication networks of the calling side and the called side notified, and performs necessary SIP procedures (INVITE and the likes).

(8) In a case where the billing rate increases by switching the communication network of the calling side to correspond to the selected wireless communication network of the called side at the above (1), the terminal of the calling side shows the billing rate to the user and inquires the user to select switching of the communication network, no switching of the communication network or cancellation of the call to the wireless communication terminal of the called side. When cancellation is selected, the communication terminal of the calling side notifies the wireless communication terminal of the called side of the cancellation and ends the process. When switching is selected, the communication terminal of the calling side switches to a communication network corresponding to the network of the wireless communication terminal of the called side and performs necessary SIP procedures. When no switching is selected, the terminal of the calling side performs the necessary SIP procedures without switching the communication network.

(9) At the above (1), the communication terminal of the calling side notifies the called side of a policy (desire) with regard to a selection of the wireless communication network at the called side whether to prioritize the bandwidth which the calling side wishes the wireless communication terminal of the called side to achieve or to prioritize a lower billing rate, together with the name of the communication network to which the calling side can connect and the required bandwidth for the desired real-time application. The wireless communication terminal of the called side selects a wireless communication network to use based on the policy notified with regard to the selection of the wireless network.

(10) In a case where cancellation is selected at the above (7) and (8), the terminal of the calling side inquires the user to select whether to request (a communication enable notification request) the wireless communication terminal of the called side to send a notification to the communication terminal of the calling side when the wireless communication terminal of the called side can connect to the desired network. When the user selects not to request, the communication terminal of the calling side notifies the wireless communication terminal of the called side of cancellation and ends the process. When the user selects to request, the communication terminal of the calling side transmits the communication enable notification request to the wireless communication terminal of the called side. When receiving the communication enable notification request, the wireless communication terminal of the called side inquires the user to select grant/reject and then transmits a result of selection to the communication terminal of the calling side. When grant is selected, at a point where the wireless communication terminal of the called side can connect to the communication network desired by the calling side, the wireless communication terminal of the called side transmits the call enable notification (communication enable notification), notifying that the called side can connect to the desired network, to the communication terminal of the calling side.

(11) At the above (10), the communication terminal of the calling side stores a condition at what rate the calling side succeeded in connecting to each wireless communication terminal of the called side on the desired network and when the calling side received the call enable notification, so as to compile statistics of connection states to each wireless communication terminal of the called side at certain periods and show them in a graph.

A preferred embodiment of the present invention will now be described with reference to the accompanying drawings.

FIG. 1 is a diagram illustrating a communication system of a wireless communication network adopting a communication control method in accordance with a first embodiment of the present invention. As shown in FIG. 1, serving as servers or gateways are a DNS server 10, an SIP server 20, an SIP server 30, a gateway (GW) 40, an SMS server 50, an SIP server (or GW) 60, and an SIP server (or GW) 70. The SIP server 30 functions as a call control server, while the SMS server 50 functions as a message transmission server. Wireless communication terminals (UA; User Agent) 100 and 200 serve as communication terminals of the calling side and the called side, respectively, while a communication terminal (softphone) UA300 serves as a softphone. These terminals are connected to the servers via the internet NET1, an operator packet network NET2, an operator circuit switching network NET3, and operator wireless communication packet networks RNET1, RNET2.

The wireless communication terminal UA100, the communication terminal of the calling side, is a multi-mode terminal capable of connecting to the operator wireless communication packet network RNET1 (referred also to as a wireless network RNET1, hereinafter) and the operator wireless communication packet network RNET2 (referred also to as a wireless network RNET2, hereinafter). It is to be noted that the UA100 may be also a communication apparatus of the calling side, which is not the wireless communication terminal, or a communication terminal of the calling side incapable of transmitting and receiving an SMS message. For example, the communication terminal (softphone) UA300 may serve as the communication apparatus of the calling side. The wireless communication terminal UA200, the wireless communication apparatus of the called side, is a multi-mode terminal capable of connecting to the wireless network RNET1, the wireless network RNET2, and the operator circuit switching network NET3 (referred also to as a network NET3, hereinafter). The wireless network RNET2 is a network with a broader bandwidth than that of the wireless network RNET1. Normally, when being on standby, the wireless communication terminal UA100 registers to the SIP server 30 with one of the wireless networks. On the other hand, the wireless communication terminal UA200 is normally on standby in the operator circuit switching network NET3 and exists in a dormant state without being connected to the wireless network RNET1 and the wireless network RNET2. The communication terminal (softphone) UA300 has an environment of constant connection and has already registered to the SIP server 20.

Figure 2:
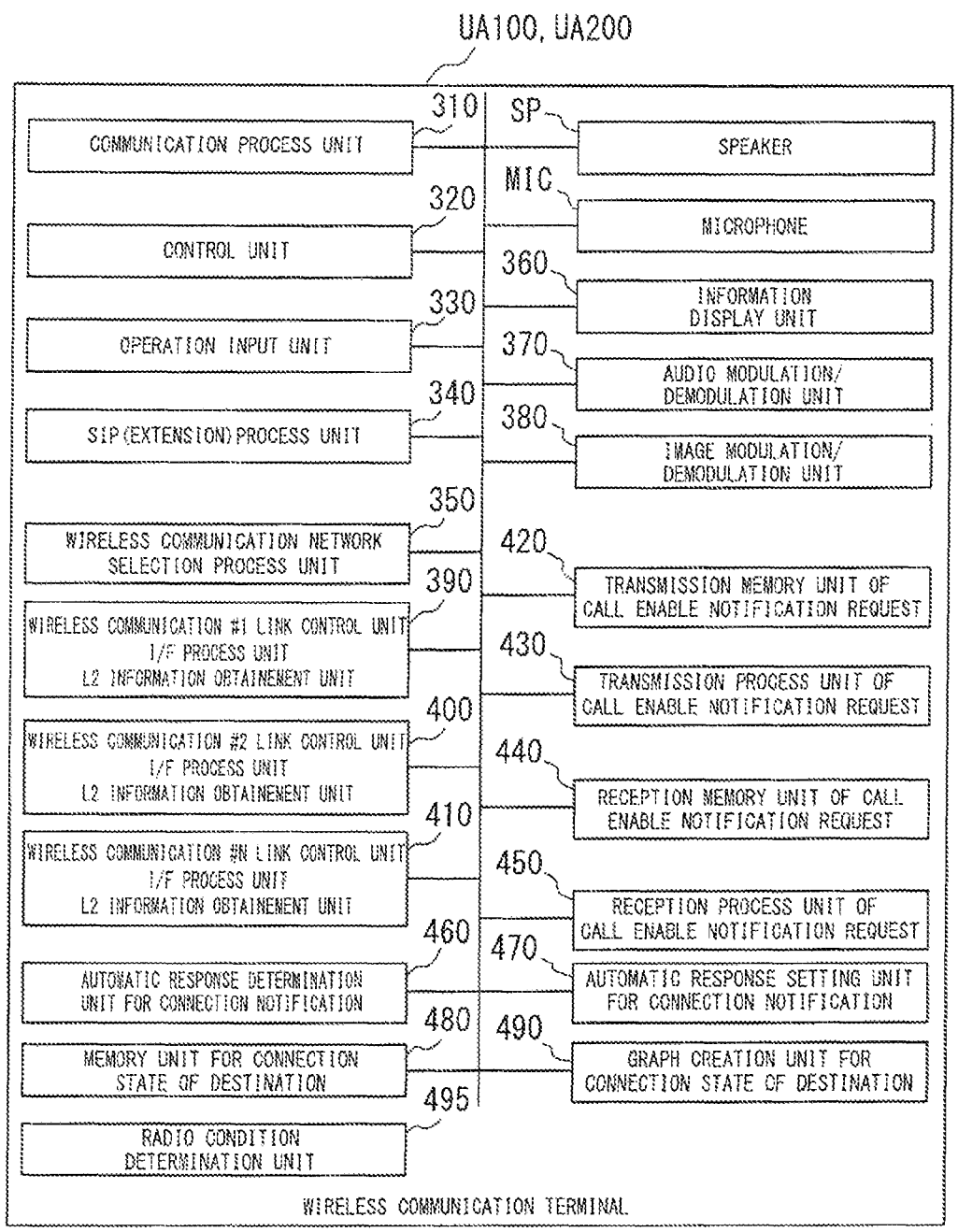
FIG. 2 is a functional block diagram of a wireless communication terminal used in the wireless communication network in accordance with the present invention.

FIG. 2 is a functional block diagram of the wireless communication terminals (wireless communication terminal of the calling side UA100 and the wireless communication terminal of the called side UA200) used in the wireless communication networks in accordance with the present invention. As shown in FIG. 2, each of the wireless communication terminals UA100, UA200 is provided with a communication process unit 310, a control unit (CPU, processor) 320, an operation (preference) input unit 330, an SIP (extension) process unit 340, a wireless communication network selection process unit 350, a speaker SP, a microphone MIC, an information display unit 360, an audio modulation/demodulation unit 370, an image modulation/demodulation unit 380, a wireless communication #1 link control unit (including 1/F process unit and L2 information obtainment unit) 390, a wireless communication #2 link control unit (including 1/F process unit and L2 information obtainment unit) 400, a wireless communication #N link control unit (including 1/F process unit and L2 information obtainment unit) 410, a transmission memory unit of call enable notification request 420, a transmission process unit of call enable notification request 430, a reception memory unit of call enable notification request 440, a reception process unit of call enable notification request 450, an automatic response determination unit for connection notification 460, an automatic response setting unit for connection notification 470, a memory unit for connection state of destination 480, and a graph creation unit for connection state of destination 490. The communication process unit 310 functions as a transmission unit and a reception unit to transmit and receive a call establishment message (INVITE message) via the wireless communication network selection process unit 350 and one of the wireless communication #1, #2 and #N link control units 390 to 410. In addition, the communication process unit 310 also functions as a transmission unit and a reception unit for transmitting and receiving an inquiry message (SMS message) with the packet switching network via the wireless communication network selection process unit 350 and one of the wireless communication #1, #2 and #N link control units 390 to 410. Moreover, the communication process unit 310 functions as a transmission unit of the calling side for transmitting a call request (INVITE) including information on a condition of the wireless communication system of the called side desired by the calling side by use of a predetermined communication system. Furthermore, the communication process unit 310 functions as a message reception unit of the called side for receiving, with regard to a call request (INVITE) to be transmitted from the calling side later, an initiation message including a communication condition desired by the calling side and a request (an initiation command of a predetermine application and the likes) requesting the called side to use at least one of the plurality of different wireless communication systems in order to receive the call request (INVITE). Still furthermore, the communication process unit 310 functions as a response unit for responding to receive the call request (INVITE) by use of a predetermined wireless communication system among the plurality of wireless communication systems in response to the initiation message received. The control unit 320 of the calling side, when the calling side receives information indicating that the called side uses a wireless communication system not satisfying the condition of the wireless communication system of the called side desired by the calling side in response to the call request (INVITE) transmitted by the transmission unit, controls so as to transmit a call enable notification request requesting the called side to transmit a call enable notification to the calling side, when the called side becomes connectable to a wireless communication system satisfying the condition of the wireless communication system of the called side desired by the calling side, to notify accordingly. In addition, when the called side receives the call enable notification request, which is a message requesting the called side to send a notification to the calling side when the called side becomes connectable to the wireless communication system satisfying the condition of the wireless communication system of the called side desired by the calling side, in response to the response by the response unit, the communication process unit 310 of the called side functions as a control unit for controlling so as to transmit the call enable notification, which is a message notifying that the called side can connect to the wireless communication system satisfying the condition, when the called side becomes connectable to the wireless communication system satisfying the condition, by use of the wireless communication system. At the called side, the reception memory unit of call enable notification request 440 and the reception process unit of call enable notification request 450 function as a request reception unit for receiving the call enable notification request, a determination unit for determining whether to grant the call enable notification request received, and a cancellation unit for cancelling (UNREGISTER) use of the predetermined wireless communication system used by the reception unit when it is determined to grant the call enable notification request received. The determination unit also determines, by comparing the call enable notification request received to a condition of a mode set in advance (an automatic mode, a manual mode, a normal mode, a silent mode, and the likes), whether to grant the call enable notification request received based on the mode. Moreover, the determination unit determines, by comparing the call enable notification request received to a condition of notification party set in advance (set grant/rejection for each call party) whether to grant the call enable notification request received based on the notification party.

Figure 3:
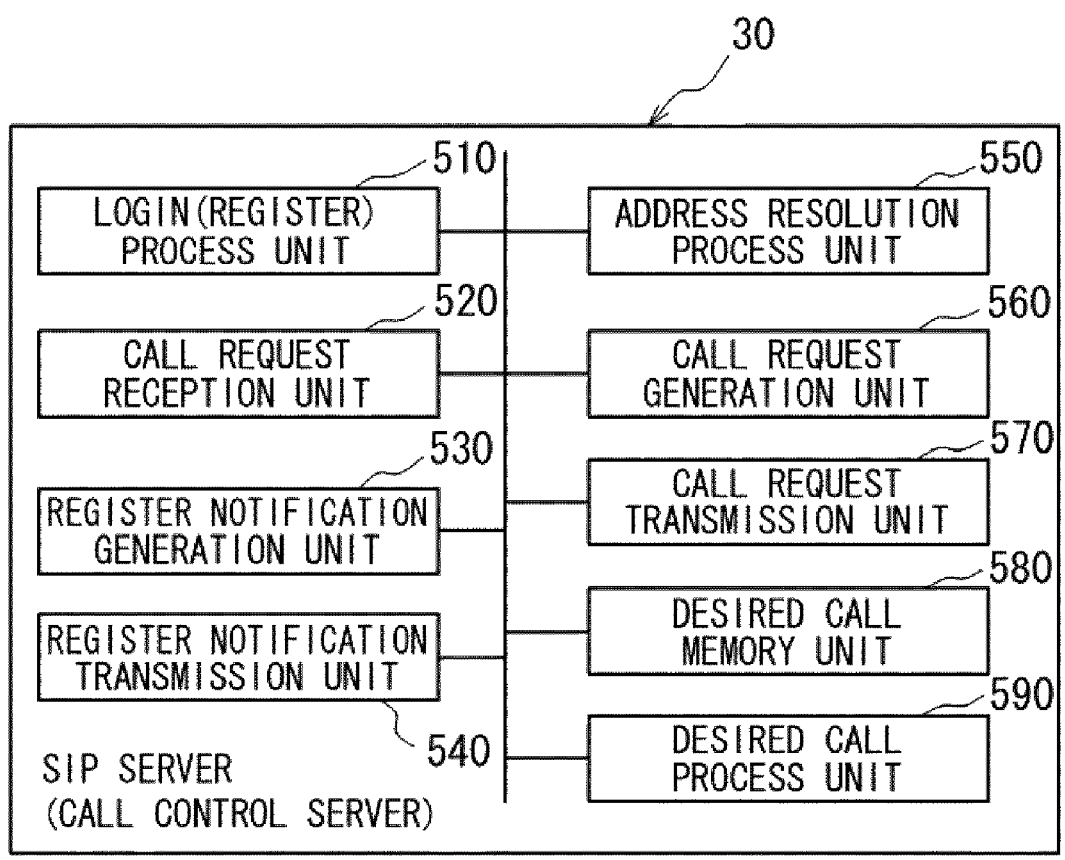
FIG. 3 is a functional block diagram of an SIP server (call control server) used in the wireless communication network in accordance with the present invention.

FIG. 3 is a functional block diagram of the SIP server (call control server) used in the wireless communication network in accordance with the present invention. As shown in FIG. 3, the SIP server 30 is provided with a login (register) process unit 510, a call request reception unit 520, a register notification generation unit 530, a register notification transmission unit 540, an address resolution process unit 550, a call request generation unit 560, a call request transmission unit 570, a desired call memory unit 580 and a desired call process unit 590. The login (register) process unit 510 receives a login (REGISTER) request from the terminal and performs necessary process. The call request reception unit 520 receives the call establishment message (Invite message) including preference information of the calling side and for calling the called side. The call request generation unit 560 generates call request information including information indicating that the call establishment message is received and a desired condition (preference information) included in the call establishment message, so as to deliver the call establishment message received by the call request reception unit 520 to the called side. The call request transmission unit 570 transmits the call request information generated to the SMS server (message transmission server) or transmits call request information generated based on SIP protocol to the terminal of the called side. The desired call memory unit 580 stores the desired condition of a call (wireless communication network, application, billing rate and the likes that the calling side desires) received from the wireless communication terminal (origination terminal) UA100. The desired call process unit 590 performs necessary process based on the desired condition of the call received from the wireless communication terminal (origination terminal) UA100.

Figure 4:
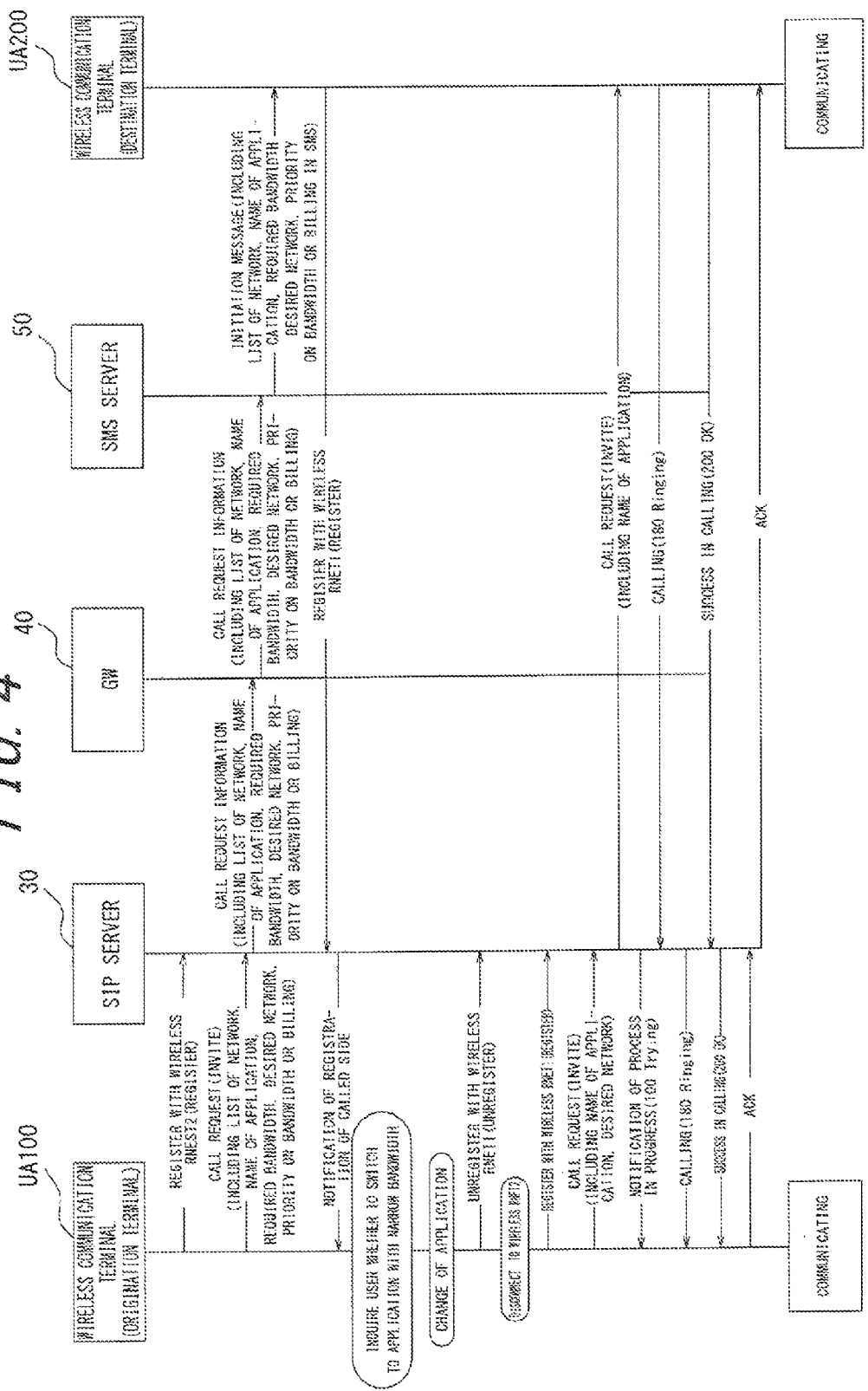
FIG. 4 is a sequence diagram illustrating communication control when a wireless communication terminal of a calling side calls a wireless communication terminal of a called side capable of connecting to a circuit switching network and starts communication with a real-time application by the communication control method in accordance with the first embodiment.

FIG. 4 is a sequence diagram illustrating communication control when the wireless communication terminal of the calling side (origination terminal) UA100 calls the wireless communication terminal of the called side (destination terminal) UA200 connectable to the circuit switching network and starts communication with the real-time application, by the communication control method in accordance with the first embodiment. FIG. 4 shows a case where, after the wireless communication terminal of the calling side (origination terminal) UA100 and the wireless communication terminal of the called side (destination terminal) UA200 exchange information on available networks, although the wireless communication terminal of the called side (destination terminal) UA200 cannot use the network desired by the calling side, the wireless communication terminal of the calling side (origination terminal) UA100 continues (without cancelling) the call by changing the application.

First, the origination terminal UA100 connects to (uses) the wireless network RNET2 and registers to the SIP server 30. In this case, the SIP server 30 performs process shown as steps S01 to S03 in FIG. 5. That is, when a register request is received from the terminal (origination terminal UA100, in this case) at step S01 in FIG. 5, the SIP server 30 registers an address, a number and a name of the network of the terminal in a register memory table exemplified in FIG. 6 at the next step S02. Then, since there is no desired call to the terminal to communicate with at this point, it is determined as No at step S03, and the SIP server 30 ends its operation to reach a standby state. In a case where the communication network with which the origination terminal UA100 has already registered differs from the network desired by the terminal itself at a point of calling, the origination terminal UA100 reregisters with the network desired.

Next, when the user of the origination terminal UA100 decides to call the destination terminal UA200, the origination terminal UA100 transmits the call request (INVITE) for the destination terminal UA200 to the SIP server 30. As exemplified in FIG. 7, information included in the call request (INVITE) is:
- a list of wireless networks to which the wireless communication terminal of the calling side can connect: IEEE802.16e, EVDO
- a name of the application: videophone (color)
- a bandwidth required for the application: 500 kbps
- a wireless network desired by the calling side: IEEE802.16e
- information on whether "priority on the bandwidth" or "priority on the low billing rate": "priority on the bandwidth"

Figure 10:
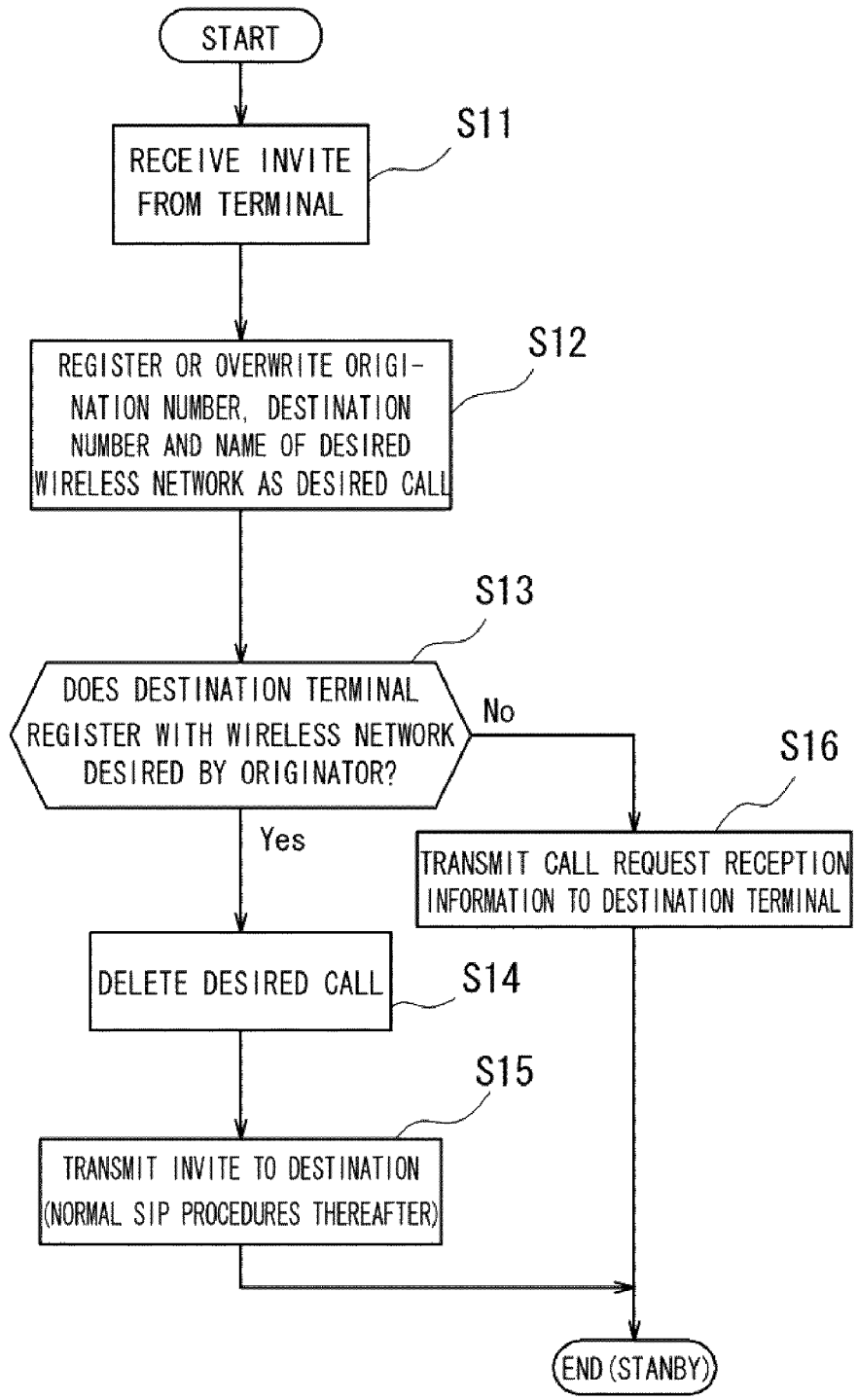
FIG. 10 is a flow chart showing the call control performed by the SIP server, in the communication control method in accordance with the first embodiment.

When the SIP server 30, upon receiving the call request (INVITE), confirms that the destination terminal UA200 has not registered yet, the SIP server 30 stores an origination number, a destination number and the wireless network desired by the calling side (originator) as a desired call in a desired call memory table (its configuration is exemplified in FIG. 8), and then transmits an initiation message of SMS from the SMS server 50 (its configuration is exemplified in FIG. 9) to the destination terminal UA200 via the GW 40. This initiation message also contains the same information as contained in the call request (INVITE). In this case, the SIP server 30 follows a sequence shown as steps S11 to S13 and then step S16 in FIG. 10. In particular, when receiving the call request (INVITE) from the terminal (the origination terminal UA100, in this case) at step S11 in FIG. 10, the SIP server 30 registers or overwrites the combination of the number of the origination terminal and the number of the destination terminal, to which the call request (INVITE) is intended, and the name of the wireless network desired by the origination terminal, as a desired call in the desired call memory table, at the next step S12. At the following step S13, it is determined whether the destination terminal has registered with the wireless network desired by the origination terminal and, if not registered, the SIP server 30 proceeds to step S16 to transmit the call request information to the destination terminal via the SMS server 50, and ends its operation so as to reach the standby state.

It is to be noted that, in a case where the wireless network of the wireless communication terminal of the called side UA200 which has already registered to the SIP server 30 is the wireless network desired by the origination terminal UA100 at the determination of the step S13, the SIP server 30 transmits the call request (INVITE) to the destination terminal. In this case, the SIP server 30 follows a sequence shown as the Yes branch of step S13, steps S14 and S15 in FIG. 10. In particular, when the answer is Yes for the determination at step S13 in FIG. 10, the SIP server 30 deletes the desired call at step S14, and transmits the call request (INVITE) to the destination terminal and then performs a normal SIP procedure thereafter at the next step S15.

In addition, in a case where the destination terminal UA200 is incapable of connecting to the operator circuit switching network (NET2), the call request (INVITE) information may be included in paging information of the operator wireless communication packet network (RNET1 or RNET2) to call the destination terminal. Moreover, in a case where the destination terminal is a PC or the likes connected to the internet and has already registered to the SIP server 30, the call request (INVITE) information may be transmitted to the address of the terminal.

When receiving the initiation message from the SMS server 50, the destination terminal UA200, in consideration of information in the initiation message and the wireless network to which the terminal itself can currently connect, selects the operator wireless communication packet network RNET1 as a wireless network to which the destination terminal UA200 connects. After connecting to the wireless network selected, the destination terminal UA200 registers to the SIP server 30. When confirming at the registration that the destination terminal UA200 connects to the operator wireless communication packet network RNET1 (the wireless network different from the one desired by the origination terminal UA100) and registers therewith, the SIP server 30 notifies the origination terminal UA100 that the destination terminal UA200 has registered with the operator wireless communication packet network RNET1. In this case, since the destination terminal UA200 connects to the wireless network different from the one desired by the origination terminal UA100 and registers therewith, the SIP server 30 controls so as not to transmit the call request (INVITE) to the destination terminal.

Figure 5:
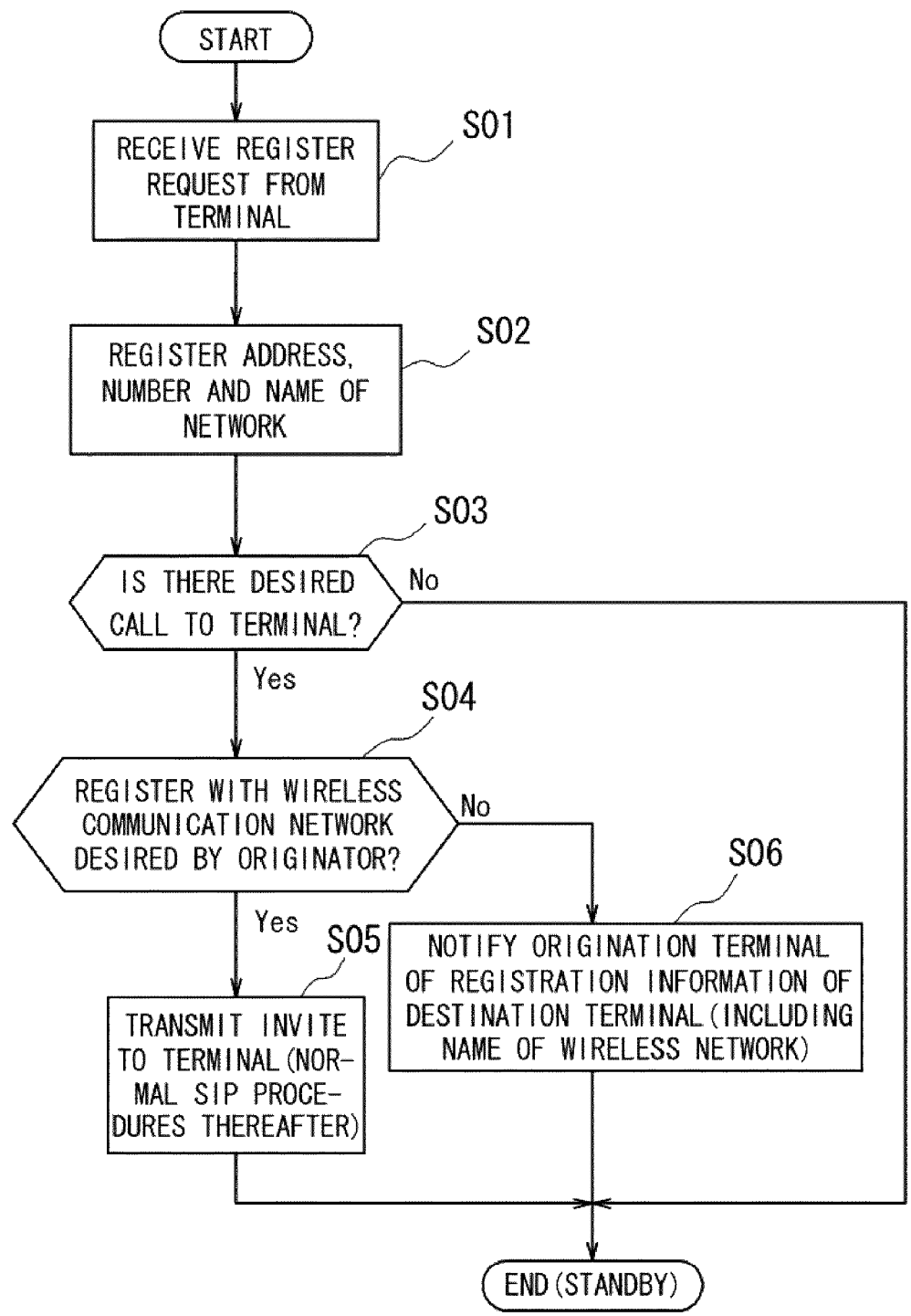
FIG. 5 is a flow chart showing call control by the SIP server by the communication control method in accordance with the first embodiment.

In this case, the SIP server 30 follows a sequence shown as steps S01 to S03, the Yes branch of step S03, step S04, the No branch of step S04, and then step S06 in FIG. 5. In particular, when receiving a register request from the terminal (the destination terminal UA200, in this case) at step S01 in FIG. 5, the SIP server 30 registers the address, the number and the name of the network of the terminal in the register memory table exemplified in FIG. 6, at the next step S02. Then, since there is a desired call to the terminal itself (destination terminal UA200), it is determined as Yes at step S03 and the process flow proceeds to step S04. At step S04, it is determined whether the destination terminal UA200 registers with the wireless network (RNET2) desired by the origination terminal UA100, and since it is determined as No, the process flow proceeds to step S06. At the step S06, the SIP server 30 notifies the origination communication terminal UA100 of registration information (including the name of the wireless network registered) of the destination terminal UA200. In a case where the destination terminal UA200 connects to the wireless network desired by the origination terminal UA100 and registers therewith, it is determined as Yes at step S04 and the process flow proceeds to step S05 where to the SIP server 30 transmit the call request (INVITE) to the destination terminal UA200 and performs the normal SIP procedure thereafter to start the communication.

Figure 11:
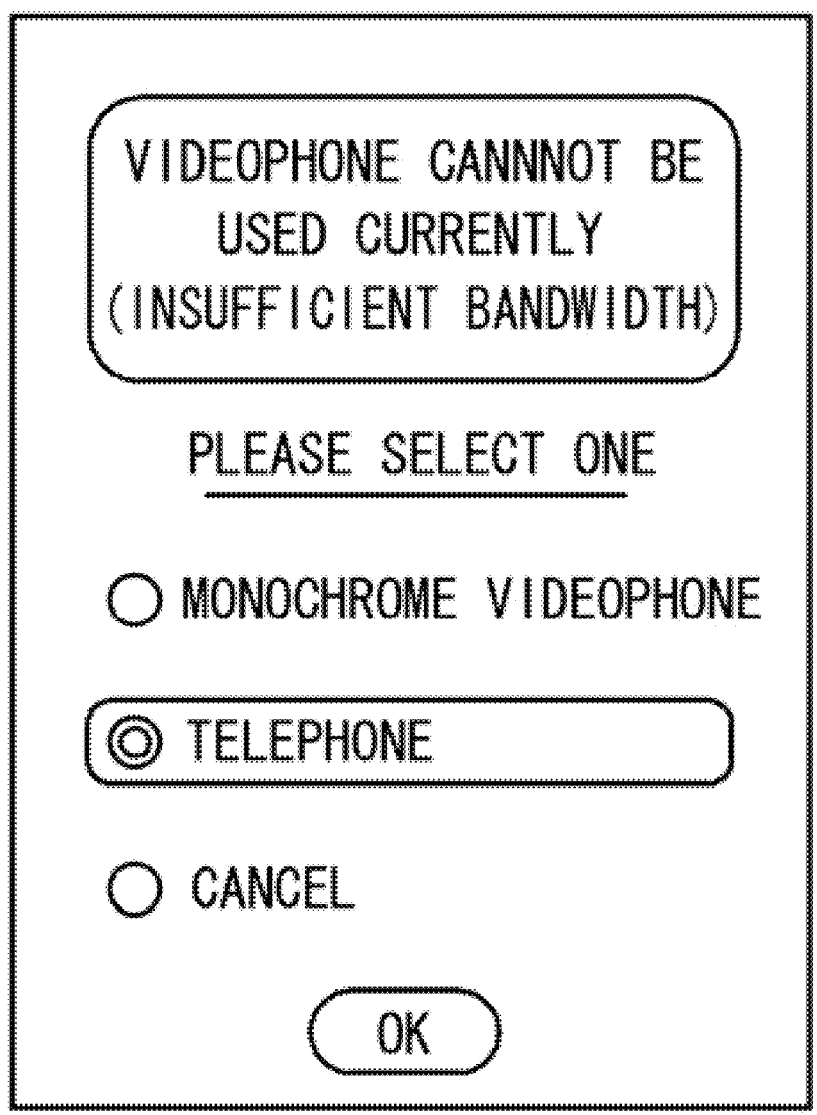
FIG. 11 is a diagram exemplifying a user selection screen displayed on the wireless communication terminal of the calling side, in the communication control method in accordance with the first embodiment.

When the origination terminal UA100, being notified of the registration information, confirms that the wireless network (RNET1) does not have enough bandwidth and that the billing rate of the wireless network (RNET1) is lower than that of the wireless network (RNET2), the origination terminal UA100 displays a user selection screen, which is exemplified in FIG. 11, so as to inquire the user to select either switching to an application (monochrome videophone or telephone) which requires a narrow bandwidth to communicate or cancel. When the user views the user selection screen and selects switching to the application to perform the communication, the origination terminal UA100 disconnects the wireless network (RNET2), connects to the wireless network (RNET1), registers to the SIP server 30, and then transmits (retransmits) the call request (INVITE) for the destination terminal UA200. When the call request is retransmitted, a previous call request (INVITE) is cancelled by the SIP server 30. Written in the call request (INVITE) are:
- a name of the application: monochrome videophone
- a wireless network desired by the calling side: wireless network RNET1

In a case where the user selects not to change the application at the above inquiry, the origination terminal UA100 transmits a previous call request (INVITE) as it stands on the wireless network (RNET2). In a case where cancellation is selected at the above inquiry, the origination terminal UA100 notifies the destination terminal UA200 accordingly via the SIP server 30. When being notified, the destination terminal UA200 disconnects the wireless network RNET1 as necessary.

When confirming that the wireless network (wireless network RNET1) with which the destination terminal UA200 registers corresponds to the wireless network (wireless network RNET1) desired by the origination terminal UA100, the SIP server 30 transmits the call request (INVITE) to the destination terminal UA200. In this case, the SIP server 30 follows a sequence shown as steps S11 to S13, the Yes branch of step S13, and steps S14, S15 in FIG. 10. Subsequently, the origination terminal UA100 and the destination terminal UA200 perform SIP procedures necessary for the call shown in FIG. 4 to start the communication with the real-time application.

Figure 12:
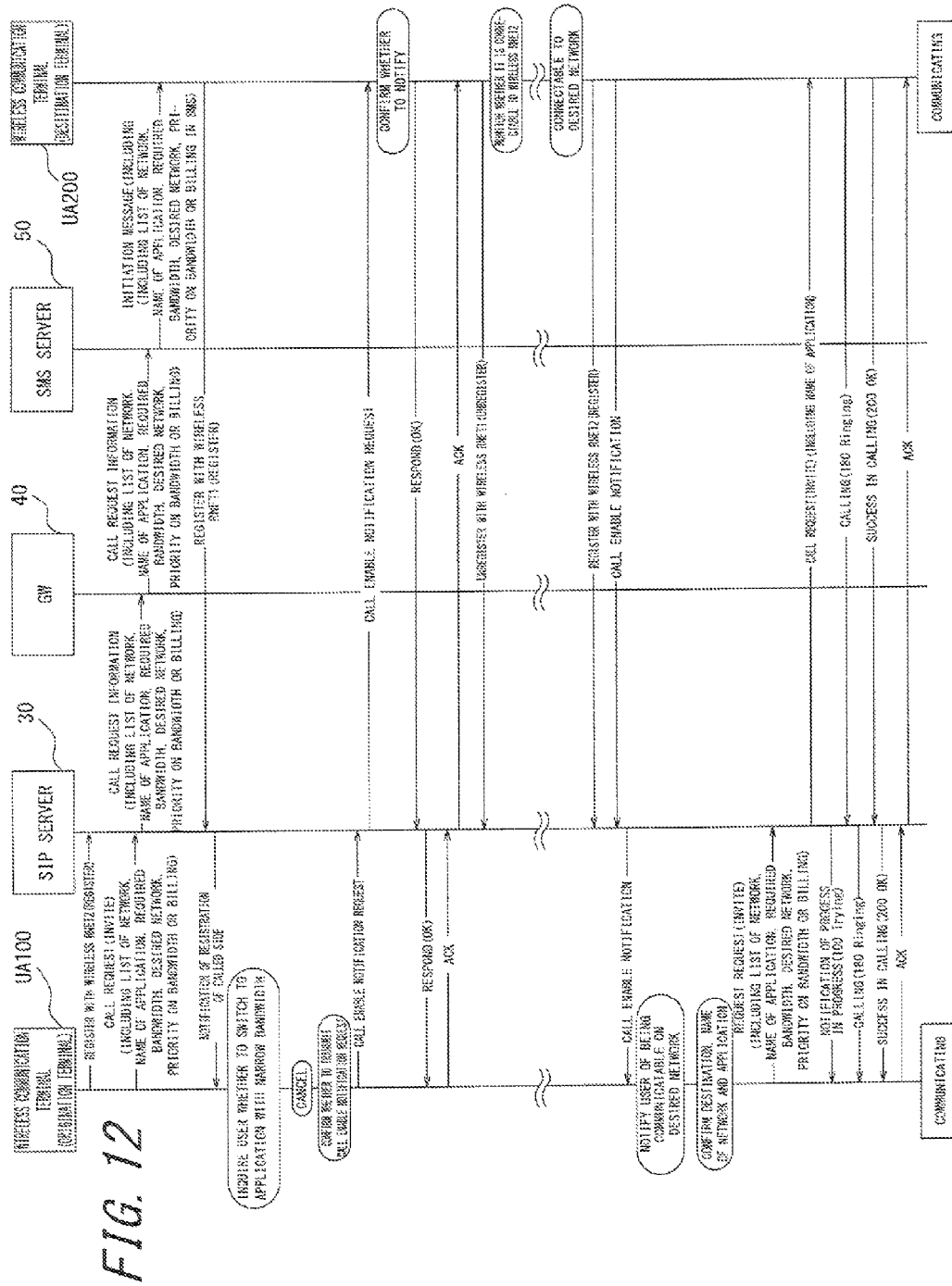
FIG. 12 is a sequence diagram showing communication control when the wireless communication terminal of the calling side calls the wireless communication terminal of the called side capable of connecting to the circuit switching network and starts the communication with the real-time application after exchanging a call enable notification request and a call enable notification, in the communication control method in accordance with the first embodiment.

FIG. 12 is a sequence diagram showing communication control by the communication control method in accordance with the first embodiment when the wireless communication terminal of the calling side (origination terminal) UA100 calls the wireless communication terminal of the called side (destination terminal) UA200 capable of connecting to the circuit switching network and starts the communication with the real-time application after exchanging the call enable notification request and the call enable notification. In particular, FIG. 12 shows a case where, after the wireless communication terminal of the calling side (origination terminal) UA100 and the wireless communication terminal of the called side (destination terminal) UA200 exchange information on available networks, since the wireless communication terminal of the called side (destination terminal) UA200 cannot use the network desired by the calling side, the wireless communication terminal of the calling side (origination terminal) UA100 cancels the call temporarily and calls again when the wireless communication terminal of the called side (destination terminal) UA200 can use the network desired by the calling side.

First, the origination terminal UA100 connects to (uses) the operator wireless communication packet network RNET2 (referred to as a wireless RNET2, hereinafter) and registers to the SIP server 30. In this case, the SIP server 30 follows a sequence shown as steps S01 to S03 in FIG. 5. In particular, when receiving the register request from the terminal (the origination terminal UA100, in this case) at step S01 in FIG. 5, the SIP server 30 registers the address, the number and the name of the network of the terminal in the register memory table, which is exemplified in FIG. 6, at the next step S02. Then, since there is no desired call to the terminal to communicate with at this point, the answer is No for the determination of step S03, and the SIP server 30 ends its operation to reach the standby state. In a case where the communication network with which the origination terminal UA100 has already registered differs from the network that the terminal itself desires at the point of calling, the origination terminal UA100 reregisters with the desired network.

Next, when the user of the origination terminal UA100 selects to call the destination terminal UA200, the origination terminal UA100 transmits the call request (INVITE) for the destination terminal UA200 to the SIP server 30. The call request (INVITE) generated based on the format shown in FIG. 7 includes the following contents:

- a list of wireless networks to which the wireless communication terminal of the calling side can connect: IEEE802.16e, EVDO
- a name of the application: videophone
- a bandwidth required for the application: 500 kbps
- a wireless network desired by the calling side: IEEE802.16e
- information on whether "priority on the bandwidth" or "priority on the low billing rate": "priority on the bandwidth"

Figures 8, 9:
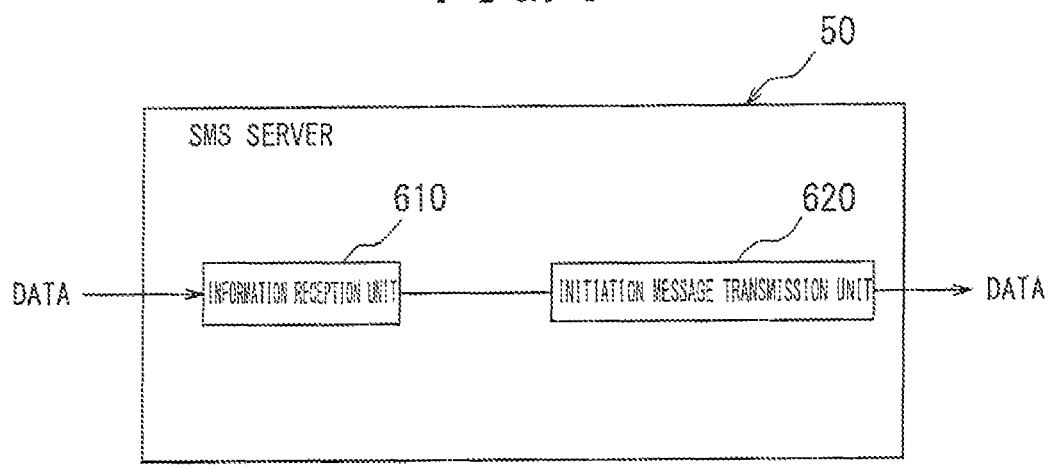
FIG. 8 is a table exemplifying a desired call memory table used by the SIP server to store a desired call of the wireless communication terminal, in the communication control method in accordance with the first embodiment.
FIG. 9 is a diagram showing a configuration of an SMS server used in a wireless communication system adopting the communication control method in accordance with the first embodiment.

When the SIP server 30, upon receiving the call request (INVITE), confirms that the destination terminal UA200 has not registered yet, the SIP server 30 stores the number of the origination terminal, the number of the destination terminal and the wireless network desired by the calling side (originator) as the desired call in the desired call memory table (its configuration is exemplified in FIG. 8). Then, the SIP server 30 transmits the initiation message of SMS from the SMS server 50 (its configuration is exemplified in FIG. 9) to the destination terminal UA200 via the GW 40. The initiation message contains the same information as contained in the call request (INVITE). In this case, the SIP server 30 follows a sequence shown as steps S11 to S13 and S16 in FIG. 10. In particular, when receiving the call request (INVITE) from the terminal (the origination terminal UA100, in this case) at step S11 in FIG. 10, the SIP server 30 registers or overwrites the combination of the number of the origination terminal and the number of the destination terminal, to which the call request (INVITE) is intended, and the name of the wireless network desired by the origination terminal, as the desired call in the desired call memory table, at the next step S12. At the following step S13, it is determined whether the destination terminal has registered with the wireless network desired by the origination terminal and, if not registered, the SIP server 30 proceeds to step S16 to transmit the call request information to the destination terminal via the SMS server 50 and then ends its operation to reach the standby state.

In a case where the wireless network with which the wireless communication terminal UA200 has already registered to the SIP server 30 is the wireless network desired by the origination terminal UA100, the SIP server 30 transmits the call request (INVITE) to the destination terminal. In this case, the SIP server 30 follows a sequence shown as the branch Yes of step S13 and steps S14, S15 in FIG. 10. Specifically, if the answer is yes for the determination at step S13 in FIG. 10, the SIP server 30 deletes the desired call at step S14, and transmits the call request (INVITE) to the destination terminal at the next step S15 and then proceeds to the normal SIP procedure thereafter.

In a case where the destination terminal UA200 is a terminal incapable of connecting to the operator circuit switching network (NET2), the call request (INVITE) information may be included in paging information of the operator wireless communication packet network (RNET1 or RNET2) to call the destination terminal. In addition, in a case where the destination terminal is a PC or the like connected to the internet and has already registered to the SIP server 30, the call request (INVITE) information may be transmitted to the address of the terminal.

When receiving the initiation message from the SMS server 50, the destination terminal UA200, in consideration of information in the initiation message and the wireless network to which the terminal itself can currently connect, selects the operator wireless communication packet network RNET1 as the wireless network to which the destination terminal UA200 connects. After connecting to the wireless network selected, the destination terminal UA200 registers to the SIP server 30. At this registration, when confirming that the destination terminal UA200 connects to the operator wireless communication packet network RNET1 (the wireless network different from the one desired by the origination terminal UA100) and registers therewith, the SIP server 30 notifies the origination terminal UA100 that the destination terminal UA200 has registered with the operator wireless communication packet network RNET1. In this case, since the destination terminal UA200 connects to the wireless network different from the one desired by the origination terminal UA100 and registers therewith, the SIP server 30 controls so as not to transmit the call request (INVITE) to the destination terminal.

In this case, the SIP server 30 follows a sequence shown as steps S01 to S03, the Yes branch of step S03, step S04, the No branch of step S04, and then step S06 in FIG. 5. In particular, when receiving the register request from the terminal (the destination terminal UA200, in this case) at step S01 in FIG. 5, the SIP server 30 registers the address, the number and the name of the network of the terminal in the register memory table, which is exemplified in FIG. 6, at the next step S02. Then, since there is a desired call to the terminal itself (destination terminal UA200), it is determined as Yes at step S03 and the SIP server 30 proceeds to step S04. At step S04, it is determined whether the destination terminal UA200 registers with the wireless network (RNET2) desired by the origination terminal UA100, and since it is determined as No, the SIP server 30 proceeds to step S06. At the step S06, the SIP server 30 notifies the origination terminal UA100 of registration information (including the name of the wireless network registered) of the destination terminal UA200. In a case where the destination terminal UA200 connects to the wireless network desired by the origination terminal UA100 and registers therewith, it is determined as Yes at step S04 and the SIP server 30 proceeds to step S05 to transmit the call request (INVITE) to the destination terminal UA200 and performs normal SIP processes thereafter to start the communication.

When the origination terminal UA100, being informed of the registration information, confirms that the wireless network (RNET1) does not have enough bandwidth and that the billing rate of the wireless network (RNET1) is lower than that of the wireless network (RNET2), the origination terminal UA100 displays the user selection screen, exemplified in FIG. 11, so as to inquire the user to select either switching to the application (monochrome videophone or telephone) which requires a narrow bandwidth to communicate or cancellation. When the user views the user selection screen and selects cancellation, the origination terminal UA100 inquires the user whether to transmit the call enable notification request requesting the destination terminal UA200, when the destination terminal UA200 can connect to the network desired by the origination terminal UA100, to notify accordingly. When the user selects "No (Do Not Transmit)", the origination terminal UA100 notifies the SIP server 30 of cancellation. The SIP server 30 notifies the destination terminal UA200 of cancellation, and the destination terminal UA200 disconnects the wireless network (RNET1) as necessary.

Figure 13:
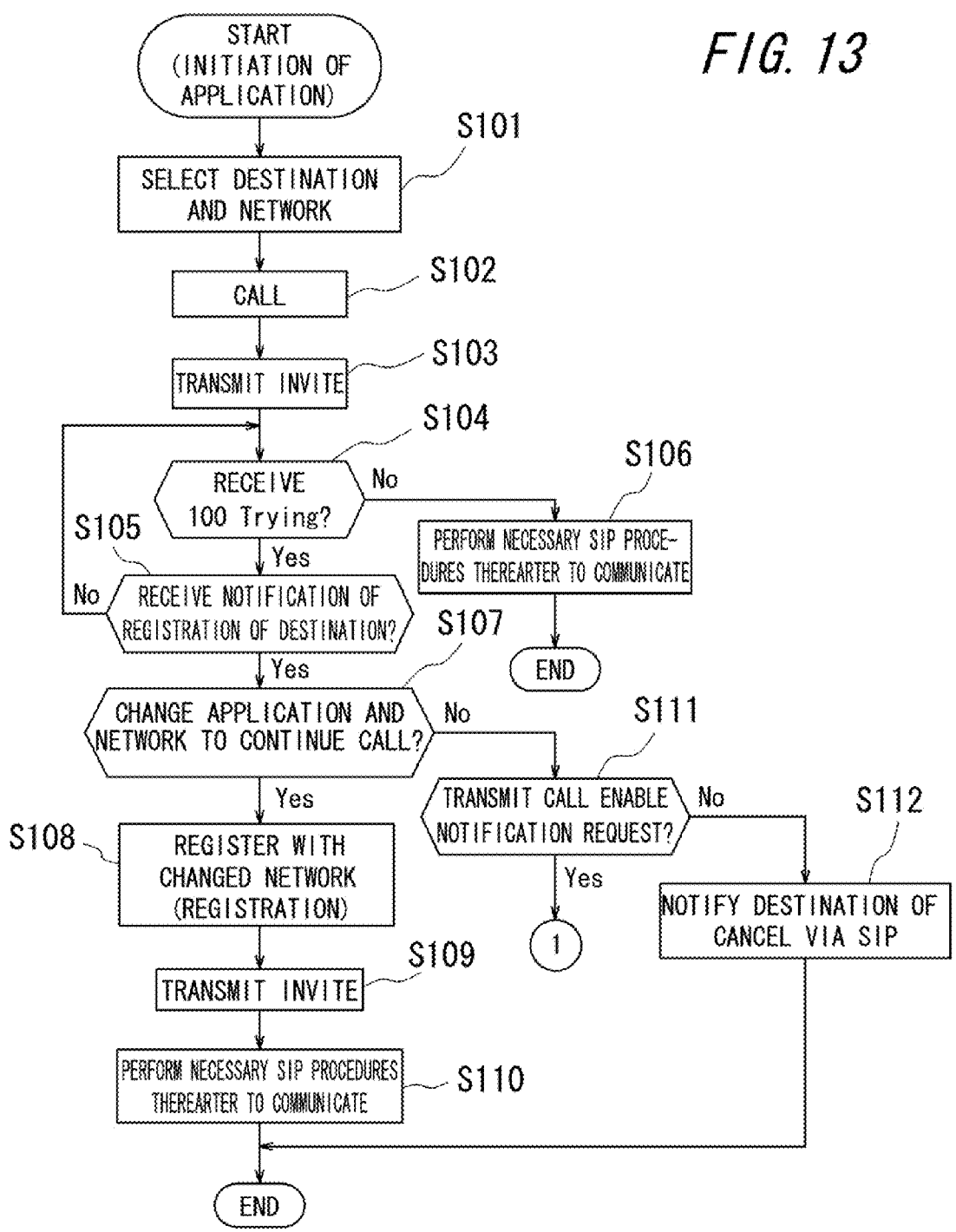
FIG. 13 is a flow chart showing communication control performed by the wireless communication terminal of the calling side, in the communication control method in accordance with the first embodiment.

During the above process, the origination terminal UA100 performs a process shown as steps S101 to S112 in FIG. 13. In particular, in a flowchart of FIG. 13 started at initiation of the above application, the origination terminal UA100 selects a destination terminal and a network at step S101, calls at step S102, transmits the call request (INVITE) at step S103, and determines whether to have received "100 Trying" at step S104. If received, the origination terminal UA100 proceeds to step S105, whereas the origination terminal UA100 proceeds to step S106 to perform necessary SIP procedures thereafter if not received. It is determined whether to have received a notification of registration of the destination terminal at step S105 and, if it is determined as No, it returns to step S104 and repeat the steps thereafter, whereas the origination terminal UA100 proceeds to step S107, if it is determined as Yes, to determine whether to change the application and the network so as to continue to call. If it is determined as Yes (call), the origination terminal UA100 registers with the network switched to at step S108, and then proceeds to step S110 to perform necessary SIP procedures thereafter. On the other hand, if it is determined as No (cancel) at step S107, the origination terminal UA100 determines whether to transmit the call enable notification request at step S111. In a case where it is determined as Yes (transmit), the origination terminal UA100 proceeds to step S113 in FIG. 14 to transmit the call enable notification request, whereas the origination terminal UA100 proceeds to step S112, if it is determined as No (do not transmit), to notify the destination terminal UA200 of cancellation via the SIP server 30.

In a case where the user selects "Yes (transmit)" at the inquiry whether to transmit the call enable notification request, the origination terminal UA100 displays user selection screens exemplified in FIG. 15(a), (b), in order to confirm the destination of the call enable notification request, the desired network and the application to use and to ask the user to input a valid duration and a message. When the user confirms and inputs as desired after viewing the user selection screens, the origination terminal UA100 assigns an ID to the call enable notification request, transmits the call enable notification request for the destination terminal UA200 (comprised of a message defined by SIP and a message indicating contents of the call enable notification, as exemplified in FIG. 16) to the SIP server 30, which is transferred from the SIP server 30 to the destination terminal UA200. During this operation, the origination terminal UA100 follows a sequence shown as the No branch of step S107, the Yes branch of step S111, and step S113 described above.

When receiving the call enable notification request, the destination terminal UA200 selects whether to grant the call enable notification request. The destination terminal UA200 is provided with an automatic mode to automatically select whether to grant and a manual mode for the user to select whether to grant. In a case where the destination terminal UA200 is set to the manual mode for the user to select whether to grant, the destination terminal UA200 notifies the user that the call enable notification request is received and asks the user to select grant/rejection. On the other hand, in a case where the automatic mode is set for the destination terminal UA200 to automatically select grant/rejection, it is set in advance by the user whether to reject all, to grant all, or to select for each notification party based on its silent mode being ON/OFF (FIG. 19(a) exemplifies the user selection screen to be displayed in this case). In a case where "select for each notification party" is selected, it is set in advance whether to reject or grant for each notification party (FIG. 19(b) exemplifies the user selection screen to be displayed in this case). The destination terminal UA200 determines whether to grant or reject the call enable notification request based on an identification of the origination terminal UA100, which sends the call enable notification request, and whether the silent mode of the destination terminal UA200 is ON or OFF at a point of receiving the request. In a case where it is determined to grant, grant (OK) as a response is notified from the destination terminal UA200 to the origination terminal UA100 via the SIP server 30, and transmission information/reception information of the call enable notification request is stored as history in both of the destination terminal UA200 and the origination terminal UA100 (FIG. 20 and FIG. 21 exemplify the history). In addition, when ACK, transmitted from the origination terminal UA100 having received the response (OK), is received by the destination terminal UA200 via the SIP server 30, the destination terminal UA200 unregisters to the SIP server 30 and starts monitoring whether it is connectable to the network desired by the calling side.

Figure 14:
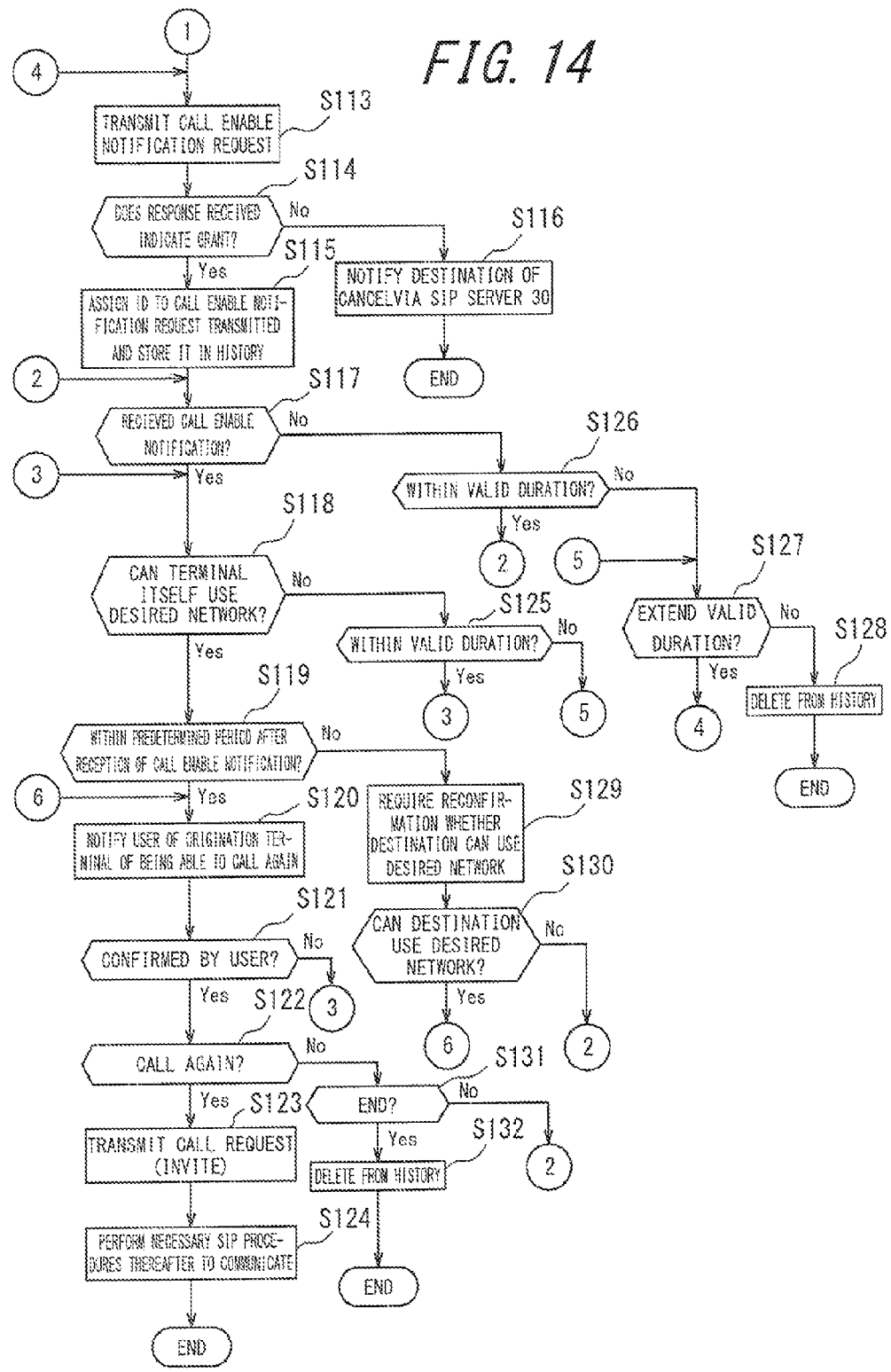
FIG. 14 is a flow chart showing the communication control performed by the wireless communication terminal of the calling side, in the communication control method in accordance with the first embodiment.
Figure 17:
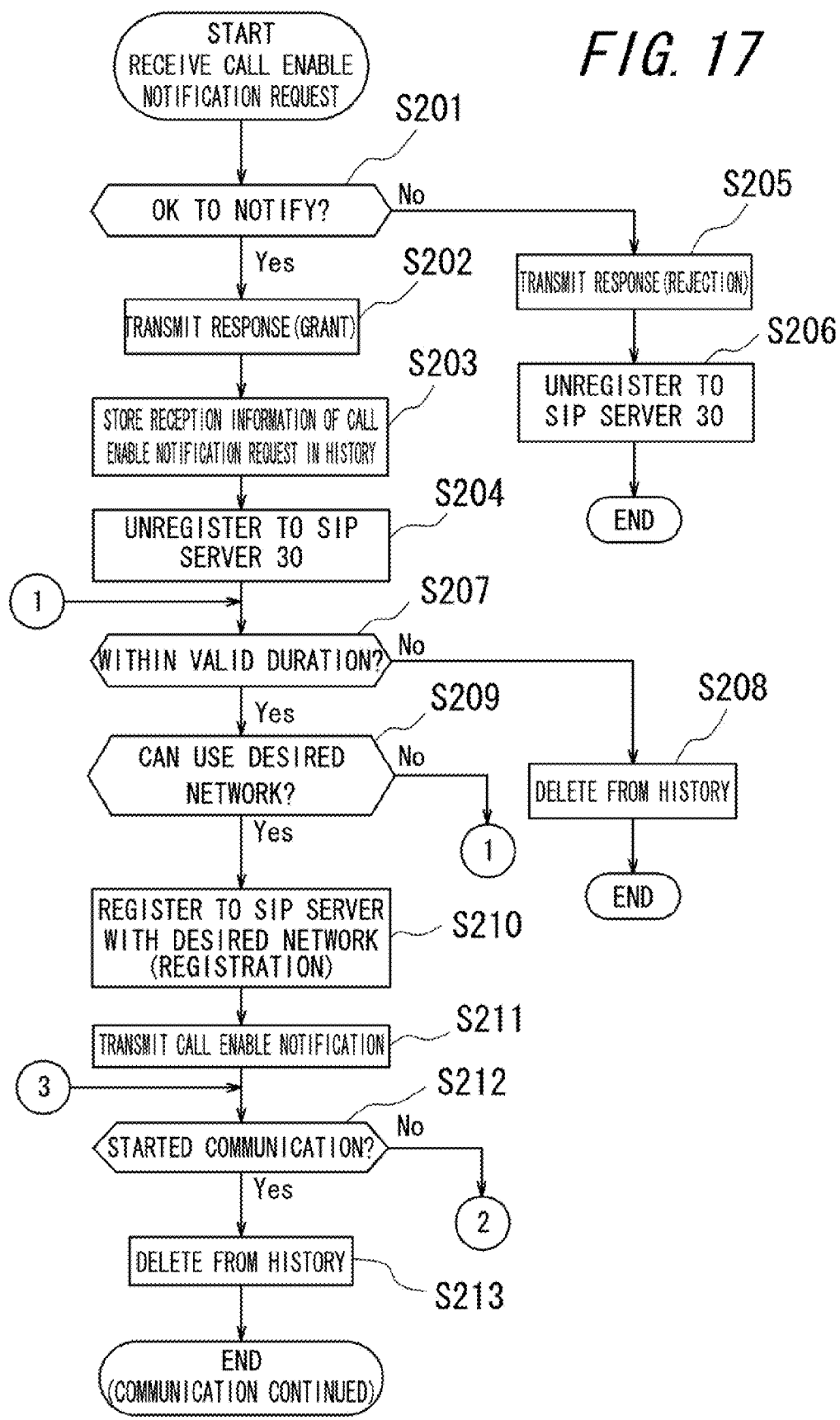
FIG. 17 is a flow chart showing the communication control for the call enable notification by the wireless communication terminal of the called side, in the communication control method in accordance with the first embodiment.

During the above process, the destination terminal UA200 follows a sequence shown as steps S201 to S209 in FIG. 17, while the origination terminal UA100 follows a sequence shown as steps S114 to S116 in FIG. 14.

The destination terminal UA200 confirms whether to notify at step S201 in the flowchart of FIG. 17 started when receiving the call enable notification request. When it is determined as Yes, the destination terminal UA200 proceeds to step S202, whereas the destination terminal UA200 proceeds to step S205 when it is determined as No. The destination terminal UA200 transmits a response (grant; OK) at step S202, stores reception information of the call enable notification request in the history at the next step S203, and unregisters to the SIP server 30 at the next step S204. On the other hand, a response (rejection; NG) is transmitted (notified) at step S205, the destination terminal UA200 unregisters to the SIP server 30 at the next step S206, and then ends its operation. At step S207 following step S204, it is determined whether it is within the valid duration and, if No (not within the valid duration), the destination terminal UA200 proceeds to step S208 to delete reception information of the call enable notification request stated above and end its operation, whereas the destination terminal UA200 proceeds to step S209 and thereafter if Yes (within the valid duration).

The origination terminal UA100 confirms whether the response received indicates a grant (OK) at step S114 in FIG. 14. If Yes (grant), the origination terminal UA100 proceeds to step S115 to assign the ID to the call enable notification request and stores transmission information of the call enable notification request in the history, whereas the origination terminal UA100 proceeds to step S116 to notify the destination terminal UA200 of cancellation via the SIP server 30, if No (rejection).

Then, when the destination terminal UA200, monitoring whether it is connectable to the network desired by the calling side, moves into an area connectable to the wireless network RNET2 desired by the calling side, the destination terminal UA200 connects to the wireless network RNET2, registers to the SIP server 30 and transmits the call enable notification so as to notify the origination terminal UA100 that the destination terminal UA200 can communicate on the wireless network RNET2 via the SIP server 30. The call enable notification includes the ID of the notification request. During this process, the destination terminal UA200 follows a sequence shown as steps S209 to S211 in FIG. 17. In particular, in a case where a result is No at step S209 for confirming whether the destination terminal UA200 can connect to the network desired by the calling side, a loop comprised of the No branch of step S209, the Yes branch of step S207 and step S209 is repeated. When it is determined as Yes at step S209, the destination terminal UA200 proceeds to step S210 to register to the SIP server 30 with the wireless network RNET2, which is the network desired by the calling side, and then to step S211 to transmit the call enable notification. The call enable notification is transmitted to the origination terminal UA100 via the SIP server 30.

Figure 22:
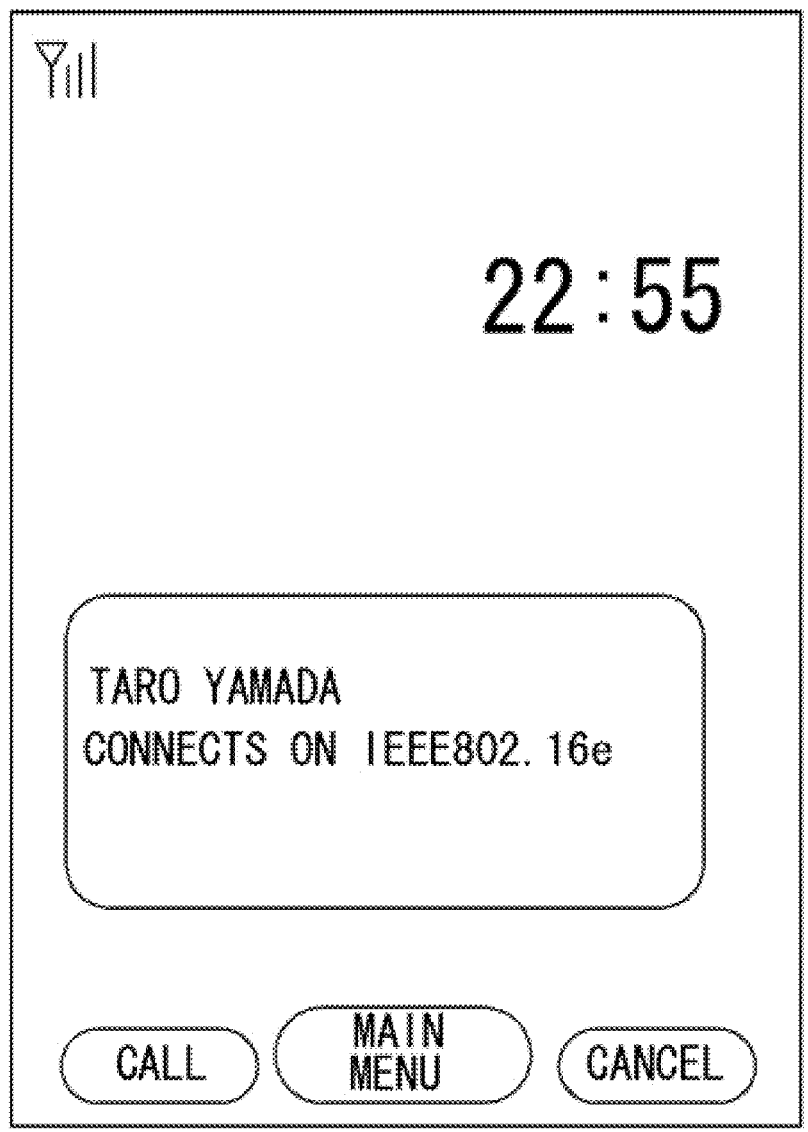
FIG. 22 is a diagram exemplifying a display screen displayed on the wireless communication terminal of the calling side when receiving the call enable notification, in the communication control method in accordance with the first embodiment.

When receiving the call enable notification, the origination terminal UA100 confirms whether the origination terminal UA100 itself can connect to the desired network. If connectable, the origination terminal UA100 notifies the user that "the origination terminal UA100 can communicate with the destination terminal UA200 on the desired network (the origination terminal UA100 can call again the destination terminal UA200)" by displaying "a display screen at reception of the call enable notification", exemplified in FIG. 22, on the terminal itself. When the user views the display screen, the origination terminal UA100 asks the user to select whether to call the destination terminal UA200 on the network with the application that are desired. When the user selects to call, the origination terminal UA100 calls the destination terminal UA200 to communicate therewith by the same process as the above steps S101 and thereafter.

During this process, the origination terminal UA100 follows a sequence shown as steps S117 to S124 in FIG. 14. In particular when it is determined as Yes at step S117 for confirming whether to have received the call enable notification, the origination terminal UA100 confirms whether the terminal itself can connect to the above desired network at step S118 and, if connectable, proceeds to step S119 to checks whether it is within a predetermined period since the call enable notification is received. If it is determined as Yes (within the predetermined period), the origination terminal UA100 proceeds to step S120 to notify the user that the origination terminal UA100 can call again the destination terminal UA200. At the next step S121, the origination terminal UA100 checks whether the user has confirmed, and then returns to step S118 if there is no confirmation (No), whereas the origination terminal UA100 proceeds to step S122, when there is a confirmation (Yes), to inquire the user of the origination terminal UA100 whether to call again or not. If it is determined as Yes (call again), the origination terminal UA100 proceeds to step S123 to transmit the call request (INVITE) and, at the next step S124, performs necessary SIP procedures to communicate.

In a case where the origination terminal UA100 itself cannot connect to the desired network at the above step S118, the origination terminal UA100 continues to check whether the terminal itself can connect to the network desired until the valid duration has passed. When the origination terminal UA100 becomes connectable to the desired network during the check and it is within the predetermined period after reception of the call enable notification, the origination terminal UA100 notifies the user that "it is possible to communicate on the desired network (the origination terminal UA100 can call again the destination terminal UA200". During this process, if it is determined as No at step S118 in FIG. 14, the origination terminal UA100 checks whether it is within the valid duration at step S125. As it is within the valid duration, it is determined as Yes at step S125, and the origination terminal UA100 returns to step S118. Then, the origination terminal UA100 proceeds along the Yes branch of step S118 to step S119 to check whether it is within the predetermined period since the reception of the call enable notification.

In a case where the valid duration has passed without reception of the call enable notification, the origination terminal UA100 inquires the user whether to extend the valid duration and, in a case where the user selects to extend, retransmits the call enable notification request to the destination terminal UA200.

During this process, the origination terminal UA100 follows a sequence shown as the No branch of step S117 and steps S126 to S128 in FIG. 14. In particular, at step S126, to which the origination terminal UA100 proceeds along the No branch of step S117 when not having received the call enable notification, the origination terminal UA100 checks whether it is within the valid duration and, if it is determined as Yes (within the valid duration), returns to step S117, while proceeding to step S127 to ask the user whether to extend the valid duration, in a case where it is determined as No (not within the valid duration). When it is determined as Yes (Extend), the origination terminal UA100 returns to step S113 to retransmit the call enable notification request to the destination terminal UA200, whereas the origination terminal UA100 proceeds to step S128, in a case where it is determined as No (Do not extend), to delete transmission information of the call enable notification request from the history and ends its operation. It is to be noted that in a case where the valid duration has passed at step S125 as well, the origination terminal UA100 follows steps S127 to S128.

In a case where the predetermined period has passed before the user of the origination terminal UA100 confirms the call enable notification after receiving the notification, the origination terminal UA100 transmits the call enable notification request to reconfirm whether the destination terminal UA200 can use the desired network.

During this process, the origination terminal UA100 follows a sequence shown as the No branch of step S119, steps S129 and S130, and steps thereafter in FIG. 14. In particular, at step S129, to which the origination terminal UA100 proceeds in a case where the predetermined period has passed after reception of the call enable notification, the origination terminal UA100 requests for reconfirmation of whether the destination terminal UA200 can use the desired network. At the next step S130, the origination terminal UA100 reconfirms whether the destination terminal UA200 can use the desired network and, in a case of receiving the call enable notification notifying that the destination terminal UA200 can use the desired network (Yes) at reconfirmation, proceeds from step S120 to step S121 to wait for the user of the origination terminal UA100 to confirm the call enable notification. On the other hand, when the origination terminal UA100 receives a notification notifying that the destination terminal UA200 cannot use the desired network (No) for the reconfirmation at the above step S130, the origination terminal UA100 returns to step S117 to wait for receiving the call enable notification again from the destination terminal UA200.

In a case where the user of the origination terminal UA100 selects No (Do not call again) at the above step S122, the origination terminal UA100 proceeds to step S131 to check whether to end its operation. If No (Do not End), the origination terminal UA100 returns to step S118, whereas the origination terminal UA100 proceeds to step S132 to delete transmission information of the call enable notification request and ends its operation if Yes (End).

After transmitting the call enable notification, the destination terminal UA200 performs the history process similar to that of the origination terminal UA100.

Figure 18:
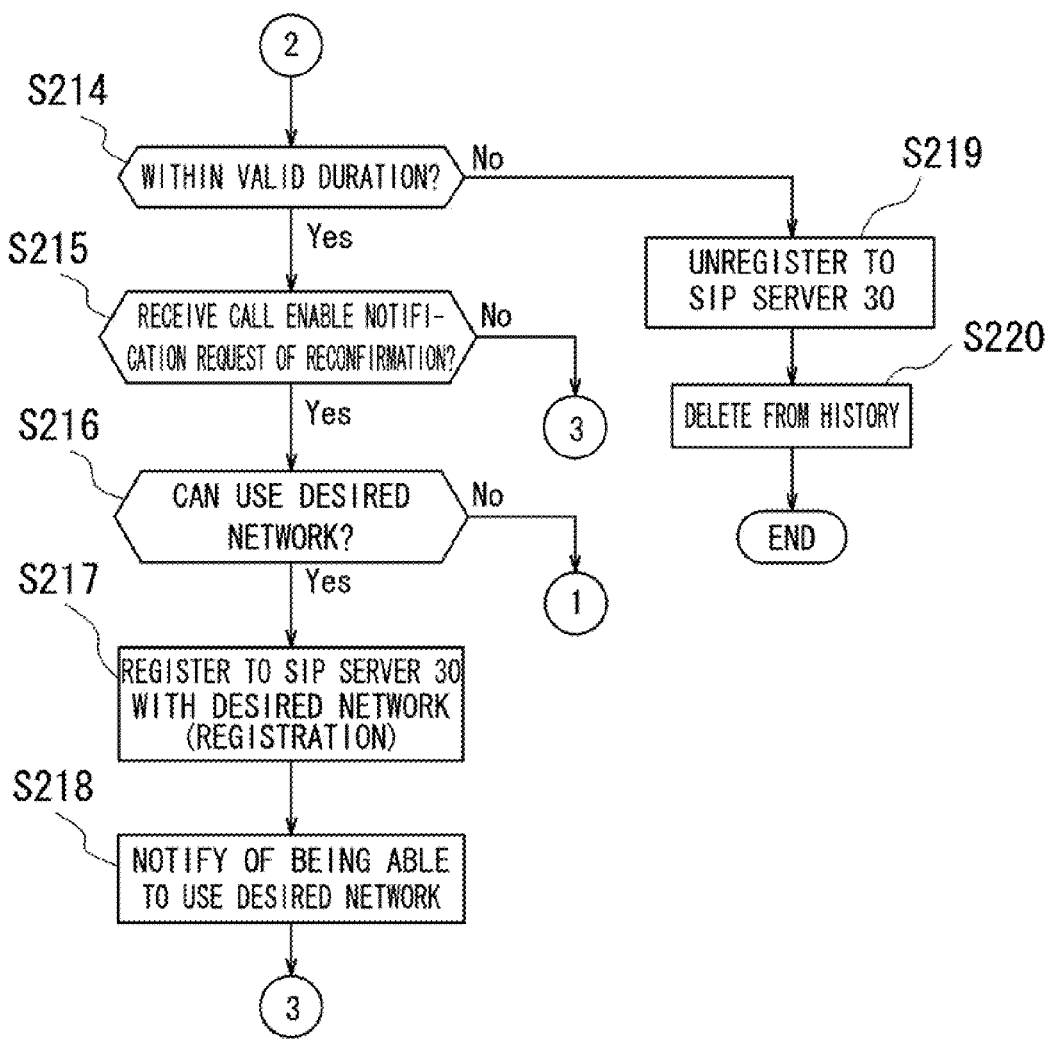
FIG. 18 is a flow chart showing the communication control for the call enable notification by the wireless communication terminal of the called side, in the communication control method in accordance with the first embodiment.

In particular, at step S212, to which the destination terminal UA200 proceeds after transmitting the call enable notification at step S211 in FIG. 17, the destination terminal UA200 confirms whether communication has started. If it is determined as Yes (Communication has started), the destination terminal UA200 proceeds to step S213 to delete reception information of the call enable notification request from the history and ends its operation (communication is continued), whereas the destination terminal UA200 proceeds to step S214 in FIG. 18, if No (Communication has not started). The destination terminal UA200 checks whether it is within the valid duration at step S214 and proceeds to step S215 if Yes (within the valid duration), whereas the destination terminal UA200 proceeds to step S219 if No (not within the valid duration). At step S215, the destination terminal UA200 checks whether to have received the call enable notification request of reconfirmation and, when it is determines as No (Not received), returns to step S212 in FIG. 17, whereas the destination terminal UA200 proceeds to step S216 if Yes (Received). The destination terminal UA200 confirms whether it is connectable to the network desired by the calling side at step S216 and, returns to step S207 if No (not connectable), whereas the destination terminal UA200 proceeds to step S217 to register to the SIP server 30 with the network desired by the calling side if Yes (connectable). Then, after notifying the origination terminal UA100 that the destination terminal UA200 can use the desired network at step S218, the destination terminal UA200 returns to step S212 to wait for start of the communication (call). If it is not within the valid duration (No) at the step S214, the destination terminal UA200 proceeds to step S219 to unregister to the SIP server 30, and then to the next step S220 to delete reception information of the call enable notification request from the history and ends its operation.

Figure 23:
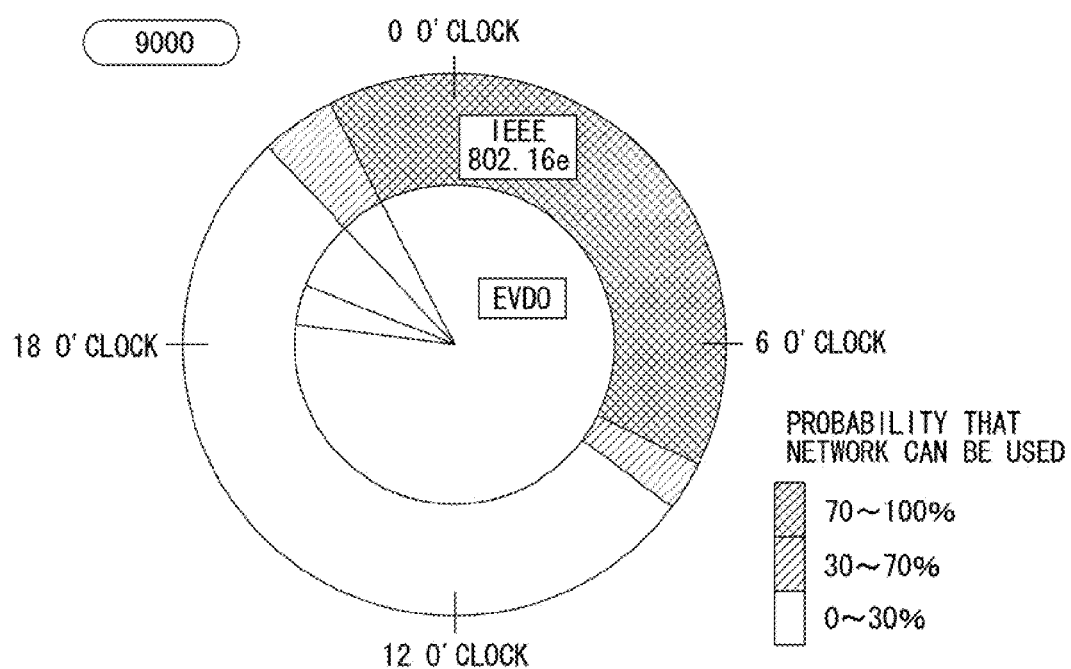
FIG. 23 is a graph exemplifying a condition when and at what rate the wireless communication terminal of the called side can connect to each network, in the communication control method in accordance with the first embodiment.
Figure 25:
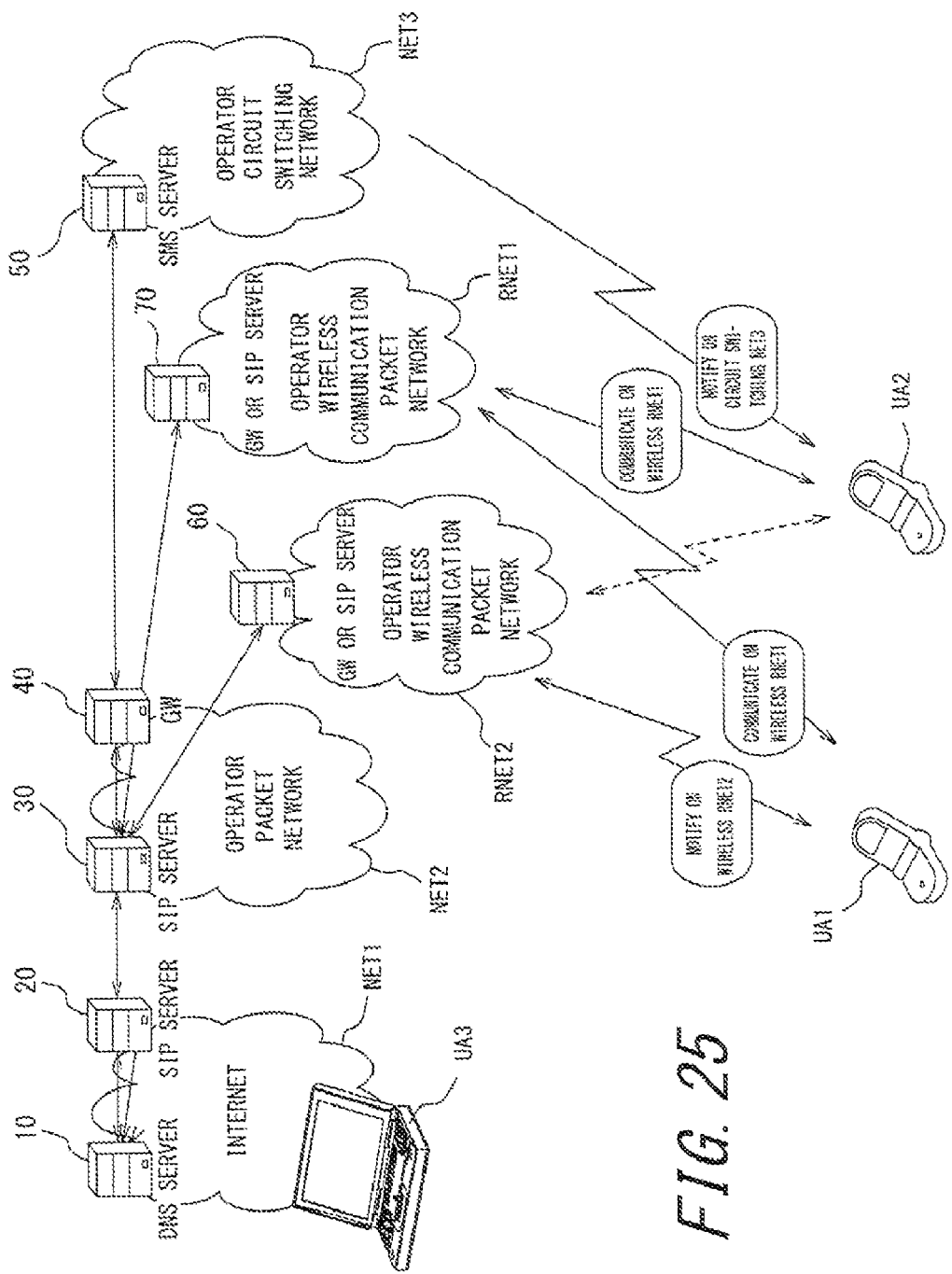
FIG. 25 is a diagram exemplifying a configuration of the wireless communication network of the conventional art.

The condition when and at what rate the destination terminal can connect to each network is displayed in a graph exemplified in FIG. 23 in accordance with the communication control method in FIG. 12. In particular, the origination terminal UA100 records when each destination terminal, to which the origination terminal transmits the call enable notification request, could/could not use the desired network in "a connection state record of the called terminal" exemplified in FIG. 24, to create and display a statistical graph as shown in FIG. 23 for each destination terminal.

According to the communication control method in accordance with the first embodiment of the present invention shown in FIG. 12, since, in a case where the user of the origination terminal (wireless communication terminal of the calling side) UA100 cancels the call for a reason that the destination terminal (wireless communication terminal of the called side) UA200, capable of using the plurality of wireless communication systems (RNET1, RNET2), cannot use the network desired by the calling side, the origination terminal UA100, when the destination terminal UA200 can use the network desired by the calling side, receives the call enable notification indicating accordingly from the destination terminal UA200, the user of the calling side can know when to call so as to connect to the destination terminal (called side) on the desired network.

The invention claimed is:

1. A communication apparatus for communicating with a wireless device, the communication apparatus comprising:
   a transmission unit for transmitting a call request including information about a bandwidth condition of a wireless communication system of a called side desired by a calling side, wherein the called side is configured to use a plurality of different wireless communication systems; and
   a control unit for transmitting, in response to receiving information indicating that the called side uses a wireless communication system not satisfying the bandwidth condition desired by the calling side, a call enable notification request requesting the called side to notify the calling side when the called side can connect to a wireless communication system satisfying the bandwidth condition desired by the calling side by transmitting a call enable notification that notifies the calling side accordingly.

2. A wireless communication apparatus configured to use a plurality of different wireless communication systems comprising:

a message reception unit for receiving, an initiation message including information about a bandwidth condition desired by a calling side and a request requesting use of at least one of the plurality of different wireless communication systems to receive a call request subsequently transmitted by the calling side;

a response unit for responding to the initiation message received so as to receive the call request by use of one wireless communication system among the plurality of wireless communication systems;

a control unit for controlling, in response to receiving a call enable notification request that requests a called side to notify the calling side when the called side can connect to a wireless communication system satisfying the bandwidth condition desired by the calling side by transmitting a call enable notification, that notifies the calling side that the called side can connect to a wireless communication system satisfying the bandwidth condition desired by the calling side.

3. A wireless communication apparatus configured to use a plurality of different wireless communication systems comprising:

a message reception unit for receiving an initiation message including information about a bandwidth condition desired by a calling side and a request requesting use of at least one of the plurality of different wireless communication systems to receive a call request subsequently transmitted by the calling side;

a response unit for responding to the initiation message received so as to receive the call request by use of a one wireless communication system among the plurality of wireless communication systems;

a control unit for controlling in response to receiving a call enable notification request that requests a called side to notify the calling side when the called side can connect to a wireless communication system satisfying the bandwidth condition desired by the calling side by transmitting a call enable notification that notifies the calling side that the called side can connect to a wireless communication system satisfying the bandwidth condition desired by the calling side: and a request reception unit for receiving the call enable notification request, a determination unit for determining whether to grant the call enable notification request, and a cancellation unit for cancelling use of the one wireless communication system used by the response unit if the determination unit grants the call enable notification request.

4. The wireless communication apparatus according to claim 3, wherein the determination unit, by comparing the call enable notification request received to a bandwidth condition of a mode which has been set in advance, determines whether to grant the call enable notification request received based on the mode.

5. The wireless communication apparatus according to claim 3, wherein the determination unit, by comparing the call enable notification request received to a bandwidth condition of a notification party which has been set in advance, determines whether to grant the call enable notification request received based on the notification party.

6. A communication control method comprising:

transmitting a call request including information about a bandwidth condition of a wireless communication system of a called side desired by a calling side, wherein the called side is configured to use a plurality of different wireless communication systems; and in response to receiving information indicating that the called side uses a wireless communication system among a plurality of wireless communication systems which does not satisfy the bandwidth condition desired by the calling side, transmitting a call enable notification request requesting the called side to notify the calling side when the called side can connect to a wireless communication system satisfying the bandwidth condition desired by the calling side by transmitting a call enable notification that notifies the calling side accordingly.

7. A communication control method comprising:

receiving, an initiation message including information about a bandwidth condition desired by a calling side and a request requesting use of at least one of a plurality of different wireless communication systems to receive a call request subsequently transmitted by the calling side;

responding to the initiation message received so as to receive the call request by use of one wireless communication system among the plurality of wireless communication systems;

controlling, in response to receiving a call enable notification request that requests a called side to notify the calling side when the called side can connect to a wireless communication system satisfying the bandwidth condition desired by the calling side by transmitting a call enable notification that notifies the calling side that the called side can connect to a wireless communication system satisfying the bandwidth condition desired by the calling side.

* * * * *